United States Patent
Ranta-Aho et al.

(10) Patent No.: US 12,231,242 B2
(45) Date of Patent: Feb. 18, 2025

(54) DYNAMIC RETRANSMISSION CONFIGURATION

(71) Applicant: Nokia Technologies Oy, Espoo (FI)

(72) Inventors: Karri Ranta-Aho, Espoo (FI); Pingping Wen, Shanghai (CN); Zhilan Xiong, Bristol (GB); Mads Lauridsen, Gistrup (DK); Jeroen Wigard, Klarup (DK); Rafhael Amorim, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 367 days.

(21) Appl. No.: 17/637,540

(22) PCT Filed: Aug. 23, 2019

(86) PCT No.: PCT/CN2019/102258
§ 371 (c)(1),
(2) Date: Feb. 23, 2022

(87) PCT Pub. No.: WO2021/035393
PCT Pub. Date: Mar. 4, 2021

(65) Prior Publication Data
US 2022/0286235 A1    Sep. 8, 2022

(51) Int. Cl.
*H04L 1/1812* (2023.01)
*H04L 1/1867* (2023.01)

(52) U.S. Cl.
CPC .......... *H04L 1/1812* (2013.01); *H04L 1/1896* (2013.01)

(58) Field of Classification Search
CPC ... H04L 1/1812; H04L 1/1896; H04L 1/1825; H04L 1/1887; H04L 1/189; H04L 2001/0092; H04L 1/1822
See application file for complete search history.

(56) References Cited

U.S. PATENT DOCUMENTS 9,118,476 B2    8/2015 Sebire et al.
11,343,019 B2 *  5/2022 Tanaka .................. H04W 84/12
(Continued)

FOREIGN PATENT DOCUMENTS

CN    103490864 A    1/2014
CN    107710721 A    2/2018
(Continued)

OTHER PUBLICATIONS

Abdelaziz Amr, et al., "Enhanced authentication based on angle of signal arrivals", IEEE Transactions on Vehicular Technology, Feb. 12, 2019, pp. 4602-4614.
(Continued)

*Primary Examiner* — Ajit Patel
*Assistant Examiner* — Wilfred Thomas
(74) *Attorney, Agent, or Firm* — Lippes Mathias LLP

(57) ABSTRACT

Example embodiments of the present disclosure relate to a solution for configuring a retransmission in communications. In an aspect, a first device transmits, to a second device, a first indication of a plurality of candidate retransmission configurations. Each of the plurality of candidate retransmission configurations includes a transmission feedback configuration and/or a data retransmission configuration. The first device selects a target retransmission configuration from the plurality of candidate retransmission configurations. The first device transmits, to the second device, a second indication of the target retransmission configuration. The first device communicates with the second device using the target retransmission configuration. The example embodiments of the present disclosure provide a dynamical multi-level indication for a retransmission scheme.

20 Claims, 8 Drawing Sheets

(56) References Cited

U.S. PATENT DOCUMENTS

| | | | |
|---|---|---|---|
| 2010/0278335 A1 | 11/2010 | Eage et al. | |
| 2013/0070629 A1* | 3/2013 | Park | H04L 1/0001 370/252 |
| 2016/0295516 A1* | 10/2016 | Su | H04W 52/24 |
| 2017/0164396 A1* | 6/2017 | Matsumoto | H04L 1/1887 |
| 2017/0180085 A1* | 6/2017 | Balasubramanian | H04L 1/1858 |
| 2018/0175974 A1* | 6/2018 | Wu | H04L 1/1685 |
| 2018/0278371 A1* | 9/2018 | Chien | H04L 1/0025 |
| 2018/0287744 A1* | 10/2018 | Sundararajan | H04L 1/1816 |
| 2019/0230656 A1 | 7/2019 | Soriaga et al. | |
| 2021/0218512 A1* | 7/2021 | Xu | H04L 1/1893 |
| 2021/0306824 A1* | 9/2021 | Li | H04W 4/40 |
| 2022/0216945 A1* | 7/2022 | Xu | H04L 1/1854 |
| 2022/0312501 A1* | 9/2022 | Lei | H04L 1/1867 |
| 2022/0368475 A1* | 11/2022 | Lei | H04L 1/1864 |
| 2022/0416954 A1* | 12/2022 | Mu | H04L 5/0055 |

FOREIGN PATENT DOCUMENTS

| | | |
|---|---|---|
| CN | 108023688 A | 5/2018 |
| EP | 2 799 895 A1 | 11/2014 |
| EP | 3 522 421 A1 | 8/2019 |
| JP | 5642266 B2 | 12/2014 |
| WO | 2011/157233 A1 | 12/2011 |
| WO | WO 2017/031646 A1 | 3/2017 |
| WO | WO 2017/040076 A1 | 3/2017 |
| WO | 2018/064182 A1 | 4/2018 |
| WO | WO 2018/082582 A1 | 5/2018 |
| WO | 2018/204491 A1 | 11/2018 |
| WO | 2019/095304 A1 | 5/2019 |
| WO | 2019/095366 A1 | 5/2019 |

OTHER PUBLICATIONS

3GPP TSG RAN WG1 Meeting #88, Athens, Greece, Feb. 13-17, 2017, R1-1701593, "NR HARQ timing and feedback schemes", ZTE, ZTE Microelectronics, 8 pgs.

"R1-1908252, Consideration of HARQ in NTN", Nokia, Nokia Shanghai Bell, 3GPP RAN WG1 Meeting #98, Aug. 2019, 3 pages.

"R1-1908776, Consideration on delay-tolerant HARQ for NTN", Sony, 3GPP TSG RAN WG1 Meeting #98, Aug. 2019, 5 pages.

"R2-1911286, Discussion on LCP procedure for NTN", Nokia, Nokia Shanghai Bell, 3GPP TSG-RAN WG2 Meeting #106, Aug. 2019, 4 pages.

"R2-1908987, Report of Email Discussion [106#71][NR/NTN] HARQ (Nomor)", Nomor Research GmbH, 3GPP TSG-RAN WG2 Meeting #107, Aug. 2019, 18 pages.

"R2-1905703, Implications of Supporting HARQ in NTN", Media Tek Inc., 3GPP TSG-RAN WG2 Meeting #106, May 2019, 3 pages.

"R1-1908933, Discussion on delay-tolerant re-transmission mechanisms for NTN", Asia Pacific Telecom, 3GPP TSG-RAN WG1 Meeting #98, Aug. 2019, 4 pages.

"R1-1908866, Considerations on HARQ, for Non-Terrestrial Networks", CMCC, 3GPP TSG RAN WG1 #98, Aug. 2019, 4 pages.

"R2-1908736, Acknowledgement Instruction for HARQ feedback", Asia Pacific Telecom Co., Ltd., 3GPP TSG-RAN WG2 #107, Aug. 2019, 3 pages.

"RI-1909109, On more delay-tolerant re-transmission mechanisms for NTN", Ericsson, 3GPP TSG-RAN WG1 Meeting #98, Aug. 2019, 6 pages.

"3rd Generation Partnership Project; Technical Specification Group Radio Access Network; NR; Physical layer procedures for control (Release 15)", 3GPP TS 38.213, V15.6.0, Jun. 2019, pp. 1-107.

"3rd Generation Partnership Project; Technical Specification Group Radio Access Network; NR; Physical layer procedures for data (Release 15)", 3GPP TS 38.214, V15.6.0, Jun. 2019, pp. 1-105.

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; Study on New Radio (NR) to support non-terrestrial networks (Release 15)", 3GPP TR 38.811, V15.1.0, Jun. 2019, pp. 1-126.

"Report of email discussion [104#51] [NR-NTN]—Impacts on user plane timers", 3GPP TSG RAN WG2 Meeting #105, R2-1900119, Agenda Item: 11.6.3.1 MAC Enhancements, Nomor Research GmbH, Feb. 25-Mar. 1, 2019, 21 pages.

"Deactivating HARQ for Non-Terrestrial Networks", 3GPP TSG RAN WG1 Meeting #92bis, R1-1804857, Agenda Item: 7.3.2, InterDigital Inc., Apr. 16-20, 2018, pp. 1-3.

"Summary for more delay-tolerant re-transmission mechanisms in NR-NTN", 3GPP TSG RAN WG1 Meeting #97, R1-1907757, Agenda Item: 7.2.5.4, MediaTek Inc., May 13-17, 2019, 8 pages.

Msc-Generator, Sourceforge, Retrieved on Apr. 3, 2024, Webpage available at : https://sourceforge.net/projects/msc-generator/.

"3rd Generation Partnership Project; Technical Specification Group Radio Access Network; Solutions for NR to support non-terrestrial networks (NTN) (Release 16)", 3GPP TR 38.821, V0.7.0, May 2019, pp. 1-86.

"Feature lead summary of HARQ enhancements for NR-U", 3GPP TSG RAN WG1 Meeting #97, R1-1907652, Agenda item: 7.2.2.2.3, Huawei, May 13-17, 2019, pp. 1-21.

IEEE 802.11, Wikipedia, Retrieved on Apr. 5, 2024, Webpage available at : https://en.wikipedia.org/wiki/IEEE_802.11.

Office Action received for corresponding Indian Patent Application No. 202247015083, dated Sep. 4, 2023, 6 pages.

Office Action received for corresponding Chinese Patent Application No. 201980099468.1, dated Mar. 18, 2024, 10 pages of Office Action and no page of translation available.

\* cited by examiner

DYNAMIC RETRANSMISSION CONFIGURATION

CROSS REFERENCE TO RELATED APPLICATION

This patent application is a U.S. National Stage application of International Patent Application Number PCT/CN2019/102258 filed Aug. 23, 2019, which is hereby incorporated by reference in its entirety.

FIELD

Example embodiments of the present disclosure generally relate to the field of communication, and in particular to devices, methods, apparatuses and a computer readable medium for configuring a retransmission in communications.

BACKGROUND

The roles and benefits of satellites in 5G have been studied in 3GPP Release 14, leading to the specific requirement to support satellite access, recognizing the added value that satellite coverage brings, as part of the mix of access technologies for 5G, especially for mission critical and industrial applications where ubiquitous coverage is crucial. In general, satellites refer to spaceborne vehicles in Low Earth Orbits (LEO), Medium Earth Orbits (MEO), Geostationary Earth Orbit (GEO), or in Highly Elliptical Orbits (HEO).

Beyond satellites, non-terrestrial networks (NTN) also refer to networks, or segments of networks, using an airborne or spaceborne vehicle for transmission. Airborne vehicles refer to High Altitude Platforms (HAPs) encompassing Unmanned Aircraft Systems (UAS)—including tethered UAS, Lighter than Air UAS, and Heavier than Air UAS—all operating at an altitude typically between 8 and 50 km, quasi-stationary. The NTN topic has been driving recent attention on 3GPP discussions, which presents as a Study Item (SI) in Release 15 (TR 38.811) and in Release 16 (TR 38.821) and is likely to become a work item in Release 17.

SUMMARY

In general, example embodiments of the present disclosure provide a solution for configuring a retransmission in communications.

In a first aspect, there is provided a first device. The first device comprises at least one processor and at least one memory storing computer program codes. Each of the plurality of candidate retransmission configurations comprises a transmission feedback configuration and/or a data retransmission configuration. The at least one memory and the computer program codes are configured, with the at least one processor, to cause the first device to transmit, to a second device, a first indication of a plurality of candidate retransmission configurations. The at least one memory and the computer program codes are also configured, with the at least one processor, to cause the first device to select a target retransmission configuration from the plurality of candidate retransmission configurations. The at least one memory and the computer program codes are also configured, with the at least one processor, to cause the first device to transmit, to the second device, a second indication of the target retransmission configuration. The at least one memory and the computer program codes are further configured, with the at least one processor, to cause the first device to communicate with the second device using the target retransmission configuration.

In a second aspect, there is provided a second device. The second device comprises at least one processor and at least one memory storing computer program codes. The at least one memory and the computer program codes are configured, with the at least one processor, to cause the second device to receive, from a first device, a first indication of a plurality of candidate retransmission configurations. Each of the plurality of candidate retransmission configurations comprises a transmission feedback configuration and/or a data retransmission configuration. The at least one memory and the computer program codes are also configured, with the at least one processor, to cause the second device to receive, from the first device, a second indication of a target retransmission configuration selected from the plurality of candidate retransmission configurations. The at least one memory and the computer program codes are further configured, with the at least one processor, to cause the second device to communicate with the first device using the target retransmission configuration.

In a third aspect, there is provided a method. The method comprises transmitting, at a first device to a second device, a first indication of a plurality of candidate retransmission configurations. Each of the plurality of candidate retransmission configurations comprises a transmission feedback configuration and/or a data retransmission configuration. The method also comprises selecting a target retransmission configuration from the plurality of candidate retransmission configurations. The method also comprises transmitting, to the second device, a second indication of the target retransmission configuration. The method further comprises communicating with the second device using the target retransmission configuration.

In a fourth aspect, there is provided a method. The method comprises receiving, at a second device from a first device, a first indication of a plurality of candidate retransmission configurations. Each of the plurality of candidate retransmission configurations comprises a transmission feedback configuration and/or a data retransmission configuration. The method also comprises receiving, from the first device, a second indication of a target retransmission configuration selected from the plurality of candidate retransmission configurations. The method further comprises communicating with the first device using the target retransmission configuration.

In a fifth aspect, there is provided an apparatus. The apparatus comprises means for transmitting, at a first device to a second device, a first indication of a plurality of candidate retransmission configurations. Each of the plurality of candidate retransmission configurations comprises a transmission feedback configuration and/or a data retransmission configuration. The apparatus also comprises means for selecting a target retransmission configuration from the plurality of candidate retransmission configurations. The apparatus also comprises means for transmitting, to the second device, a second indication of the target retransmission configuration. The apparatus further comprises means for communicating with the second device using the target retransmission configuration.

In a sixth aspect, there is provided an apparatus. The apparatus comprises means for receiving, at a second device from a first device, a first indication of a plurality of candidate retransmission configurations. Each of the plurality of candidate retransmission configurations comprises a transmission feedback configuration and/or a data retransmission configuration. The apparatus also comprises means for receiving, from the first device, a second indication of a target retransmission configuration selected from the plurality of candidate retransmission configurations. The apparatus also comprises means for communicating with the first device using the target retransmission configuration.

In a seventh aspect, there is provided a non-transitory computer readable medium storing program instructions for causing an apparatus to perform at least the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
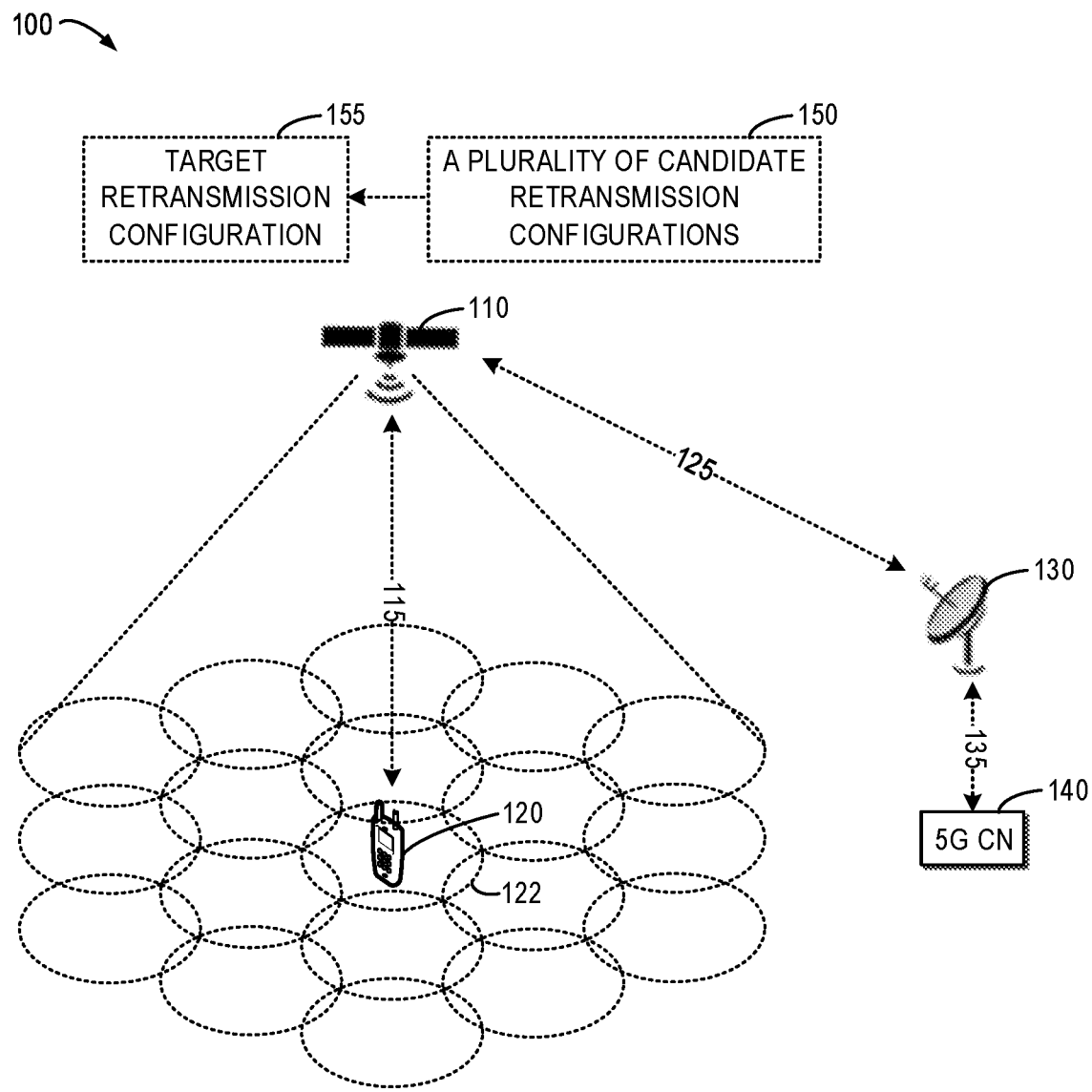
FIG. 1 illustrates a schematic diagram of a communication environment in which some example embodiments of the present disclosure can be implemented.

Principles of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every example embodiment includes the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" or the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, components and/or the like, but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), a radio access network (RAN) node, an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), an unmanned aerial vehicle (UAV), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In current 3GPP discussions, there are different deployment scenarios regarding the satellite altitude. The assumptions are that the satellites can either be deployed using GEO (geostationary earth orbit) or LEO (low earth orbit) satellites (see Table 1 as below, from the current version of 3GPP TR 38.821).

TABLE 1

Platform altitude and orbit definition (3GPP TR 38.821)

| Platform | Altitude range | Orbit |
| --- | --- | --- |
| Low-Earth Orbit (LEO) satellite | 300-1500 km | Circular around the earth |
| Medium-Earth Orbit (MEO) satellite | 7000-25000 km | |
| Geostationary Earth Orbit (GEO) satellite | 35 786 km | notional station keeping position fixed in terms of elevation/azimuth with respect to a given earth point |

It is observed that the satellites, which may implement one or more 5G cells, are far away from the earth surface, which can lead to significant latency due to the air interface propagation. The coverage area provided by a satellite in NTN is defined by the area where the elevation angle between a UE and the satellite exceeds 10 degrees. Table 2 as below shows the maximum coverable distance for NTN satellites according to the assumptions presented in the TR 38.821 and the respective round trip time latency associated with it.

It is noted that the LEO and GEO based scenarios both include scenarios where the gNB is on-board the satellite (regenerative payload) and on earth (transparent payload). The latter scenario entails that the user payload must move from UE to the satellite via the service link and then further on to the ground station (including the gNB) via the feeder link and back again for the acknowledgment, that is, two times the round trip time of the regenerative payload.

TABLE 2

NTN scenario satellite-earth distance and round trip time (3GPP TR 38.821)

| Scenarios | GEO based non-terrestrial access network (Scenario A and B) | LEO based non-terrestrial access network (Scenario C & D) |
| --- | --- | --- |
| Altitude | 35,786 km | 600 km<br>1,200 km |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 541.14 ms (service and feeder links)<br>Scenario B: 271.57 ms (service link only) | Scenario C: (transparent payload: service and feeder links)<br>25.76 ms (600 km)<br>41.75 ms (1200 km) |

TABLE 2-continued

NTN scenario satellite-earth distance and round trip time (3GPP TR 38.821)

| Scenarios | GEO based non-terrestrial access network (Scenario A and B) | LEO based non-terrestrial access network (Scenario C & D) |
|---|---|---|
| | | Scenario D: (regenerative payload: service link only) 12.88 ms (600 km) 20.87 ms (1200 km) |

Different from most services implemented in current cellular deployments, the round trip time (RTT) estimated for NTN networks is very high (between 12.88 and 541 ms). This means, for example, that between a first transmission originated from either of the link nodes (either the UE or the gNB) the minimum elapsed time until this same node receives an ACK/NACK feedback will correspond to several 5G NR transmission time intervals (TTIs) or even multiple frames. For this reason, it has already been proposed to disable hybrid automatic repeat request (HARQ) for GEO stationary satellites, while the solution for LEO is also under discussion (see, for example, RAN2 email discussion R2-1900119).

In particular, during the 3GPP discussions, it has been stated that there is a problem with the HARQ being continuously used in LEO and GEO deployments. However, some services—for example control related information or mission critical data—may require high reliability with the smallest latency possible, while others, like streaming a video from a movie or series is less critical. 5G already has established that different flows should receive different treatments given the specific requirements (QoF). However, it is assumed that the HARQ functionality is always on.

Therefore, given the different requirements for different flows and the fact that there are mission critical services to be provided by a satellite in remote areas, there is a need for the possibility of activating/deactivating the feedback and/or retransmission (for example, the HARQ processes) dynamically. In addition, operations for the dynamic activation/deactivation of the feedback and/or retransmission may need to entail minor impact on other parts of the standards, for example, the downlink control information (DCI) format.

In view of the above problems and other potential problems in the traditional solutions, example embodiments of the present disclosure provide a solution for configuring a retransmission in communications. In contrast to the traditional schemes, the example embodiments of the present disclosure employ low-bit size multi-level indication for a dynamical multi-level retransmission scheme, for example, by radio resource control (RRC) signaling and the DCI signaling between a network device and a terminal device.

In addition, the example embodiments of the present disclosure can be used to intermediate solutions rather than the just two options of enabling and disabling. For example, it can also be coupled with other solutions, such as "blind retransmissions" or "proactive k-repetitions." Advantageously, the example embodiments of the present disclosure can be used to configure HARQ processes in Non-Terrestrial Networks (NTN) deployments, specifically when the connectivity to UEs on the ground is provided by satellites. More generally, the example embodiments of the present disclosure can also be applied to other applications in cellular networks that are latency constrained.

The example embodiments of the present disclosure do not need additional requirements for DCI modification. Instead, they may rely on a radio resource configuration to automatically interpret if a given HARQ process is enabled or disabled and taking the appropriate action defined in the standards. For example, by reading the HARQ indexes, that are still kept in the DCI, the UE can perform different actions depending if particular process is enabled/disabled, while some example embodiments of the present disclosure may rely on pre-configured HARQ behaviors by RRC signaling and dynamical DCI indication for HARQ disabling. In addition, the example embodiments of the present disclosure only require RRC signaling of very low bit rate, and can be made asymmetric for uplink transmissions and downlink transmissions. Principles and implementations of example embodiments of the present disclosure will be described in detail below with reference to the figures.

FIG. 1 illustrates a schematic diagram of a communication environment 100 in which some example embodiments of the present disclosure can be implemented. The communication environment 100 may include a first device 110, which may be a satellite and provides wireless connection for a second device 120 within coverage 122, also referred to as a serving cell 122 among a plurality of cells supported by the first device 110. The second device 120 may communicate with the first device 110 via a communication channel 115, such as a wireless channel 115. In some example embodiments, the communication channel 115 may be at a first frequency f1. For transmissions from the first device 110 to the second device 120, the communication channel 115 may be referred to as a downlink channel, whereas for transmissions from the second device 120 to the first device 110, the communication channel 115 may alternatively be referred to as an uplink channel.

The first device 110 can further communicate with a third device 130 via a communication link 125, for example, at a second frequency f2. In some example embodiments, the third device 130 may be a gateway device associated with a 5G core network (CN) 140 via a communication link 135. In some cases, the function of the gNB can be performed by the first device 110, that is, the gNB is on-board the satellite with regenerative payload. Alternatively, in some other cases, the function of the gNB can be performed by the third device 130, that is, the gNB is on earth with transparent payload.

In some example embodiments, for a transmission between the first device 110 and the second device 120, the transmitting device may need to perform a retransmission to the receiving device. For example, the retransmission may be performed if the receiving device does not receive the transmission successfully. In this event, the receiving device may transmit to the transmitting device a feedback indicating whether the transmission is received successfully. Upon receiving a negative feedback from the receiving device, the transmitting device can perform the retransmission.

However, in other example embodiments, the transmitting device may perform one or more retransmissions without a feedback from the receiving device, which retransmission scheme may be referred to as a blind retransmission. As used herein, the term "blind retransmission" may generally refer to a retransmission scheme in which a transmitting device blindly performs one or more retransmissions for a transmission without a feedback from a receiving device. Therefore, the blind retransmission scheme may include, but not limited to, a proactive k-repetition scheme, a slot aggregation scheme, any other retransmission scheme without a feedback, or the like.

In order to dynamically and flexibly configure the retransmissions between the first device 110 and the second device 120, a plurality of candidate retransmission configurations 150 can be predefined or preconfigured for the first device 110 and the second device 120. For example, the plurality of candidate retransmission configurations 150 can be configured by the first device 110 and informed to the second device 120. Since the plurality of candidate retransmission configurations 150 can provide various different retransmission configurations for communications between the first device 110 and the second device 120, thereby improving the flexibility of the retransmission configurations.

When a retransmission needs to be performed between the first device 110 and the second device 120, the first device 110 may select a target retransmission configuration 155 from the plurality of candidate retransmission configurations 150, for example, based on the specific current communication condition associated with the first device 110 and the second device 120. Then, the first device 110 can inform the second device 120 of the target retransmission configuration 155, based on which the two devices can communicate with each other accordingly.

Although it is described that the target retransmission configuration 155 is selected by the first device 110 in FIG. 1 and the following description, this is only for the purpose of illustration without suggesting any limitations. In other example embodiments, the target retransmission configuration 155 may be selected by the second device 120, other devices in FIG. 1, or even a device not shown in FIG. 1. In this event, the device which selects the target retransmission configuration 155 can inform the first device 110 and/or the second device 120 of the target retransmission configuration 155.

In some example embodiments, the first device 110 may be a network device, and the second device 120 may be a terminal devices. In some other example embodiments, the first and second devices 110 and 120 may be any other suitable communication devices, which can communicate with each other. Example embodiments of the present disclosure are not limited to the example scenario of FIG. 1.

In this regard, it is noted that although the first device 110 is schematically depicted as a satellite and the second device 120 is schematically depicted as a mobile phone in FIG. 1, it is understood that this depiction is only for example without suggesting any limitation. In addition, it is noted that example embodiments of the present disclosure can be applicable to both the uplink transmissions, in which a terminal device transmits messages to a network device, and the downlink transmissions, in which a network device transmits messages to a terminal device.

It is to be understood that the number of communication devices, the number of communication channels, and the number of other elements as shown in FIG. 1 are only for the purpose of illustration without suggesting any limitations. The communication environment 100 may include any suitable number of communication devices, any suitable number of communication channels, and any suitable number of other elements adapted for implementing example embodiments of the present disclosure. Although not shown, it would be appreciated that all the devices and other function entities may belong to and be located in the same communication network or different communication networks.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
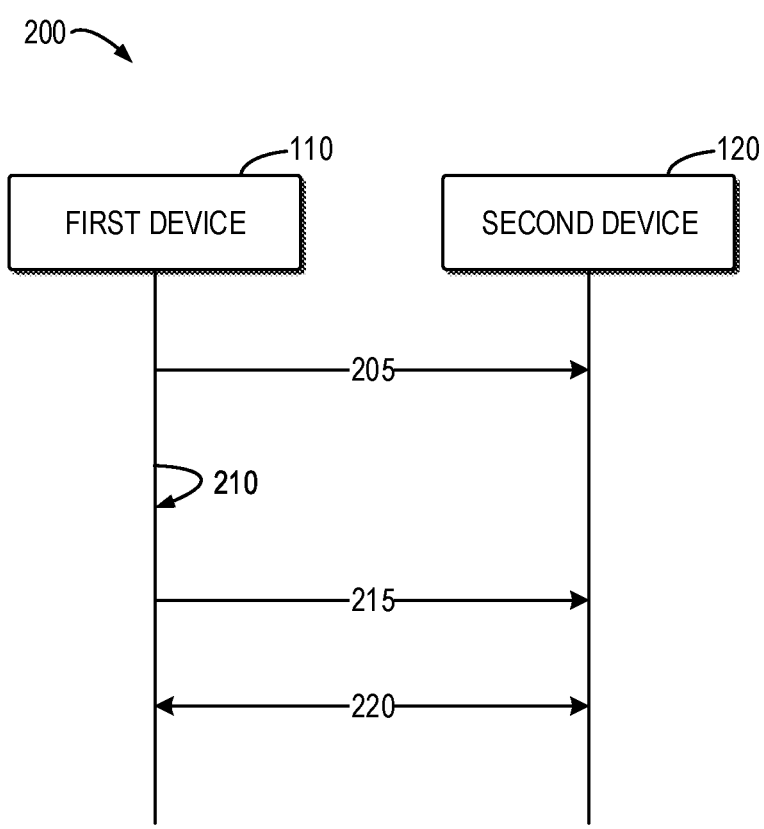
FIG. 2 illustrates an example communication process between a first device and a second device in accordance with some example embodiments of the present disclosure.

Reference is now made to FIG. 2, which illustrates an example communication process 200 between the first device 110 and the second device 120 in accordance with some example embodiments of the present disclosure. For the purpose of discussion, the communication process 200 will be described with reference to FIG. 1. However, it would be appreciated that the communication process 200 may be equally applicable to other communication scenarios where two devices communicate with each other.

As shown in FIG. 2, the first device 110 transmits 205 a first indication of the plurality of candidate retransmission configurations 150 to the second device 120. Upon receiving 205 the first indication, the second device 120 may know the plurality of candidate retransmission configurations 150 configured by the first device 110, for example. As used herein, a candidate retransmission configuration may include a transmission feedback configuration and/or a data retransmission configuration. For example, the transmission feedback configuration may refer to whether a feedback for a transmission is enabled or disabled. Similarly, the data retransmission configuration may refer to whether a data retransmission for a data transmission is enabled or disabled. More generally, the transmission feedback configuration can include any configuration of a transmission feedback, and the data retransmission configuration can include any configuration of data retransmission.

As mentioned above, in order to achieve a multi-level retransmission scheme, the first device 110 and the second device 120 can employ various different retransmission configurations for their communications, including both the transmissions from the first device 110 to the second device 120 and the transmissions from second device 120 to the first device 110. In other words, in the case that the first device 110 is a network device and the second device 120 is a terminal device, the retransmission configurations can apply to both downlink transmissions and uplink transmissions.

As used herein, a retransmission configuration may refer to whether a retransmission function is enabled, whether a function (for example, a feedback) related to a retransmission is enabled, a manner in which a retransmission is determined to be performed, or the like. More generally, a retransmission configuration may refer to any configuration associated with a retransmission. In some example embodiments, an example of a retransmission configuration may be the HARQ process as defined in the 3GPP specifications. As another example, another retransmission configuration may be that no retransmission needs to be performed for a transmission between the first device 110 and the second device 120. More generally, the term "retransmission configuration" as used herein may include any configuration or setting related to any existing or future retransmission scheme, including an option of disabling a retransmission scheme.

As indicated, the plurality of candidate retransmission configurations 150 may include different retransmission configurations, so as to improve the flexibility of configuring the retransmissions between the first device 110 and the second device 120. For example, in a candidate retransmission configuration, a feedback may be enabled for a transmission. In another candidate retransmission configuration, a feedback may be disabled for a transmission. This means that the data retransmission can be enabled or disabled by default, and the feedback can be enabled or disabled by the first device 110. In a further candidate retransmission configuration, a data retransmission may be enabled for a transmission. In a still further candidate retransmission configuration, a data retransmission may be disabled for a transmission. This means that the feedback can be enabled or disabled by default, and the data retransmission can be enabled or disabled by the first device 110. This may be advantageous in that two-way delay between the first device 110 and the second device 120 may be great, for example, about 500 ms. If the first device 110 can indicate disabling of the data retransmission, then the second device 120 does not need to restore the data for a long time, for example, 500 ms.

Additionally, in a candidate retransmission configuration, a feedback and a data retransmission may be enabled for a transmission. In another candidate retransmission configuration, a feedback may be enabled and a data retransmission may be disabled for a transmission. In a further candidate retransmission configuration, a feedback and a data retransmission for a transmission may be disabled. This means that both of the feedback and the data retransmission can be enabled or disabled by the first device 110. In a still further candidate retransmission configuration, a blind retransmission may be enabled for a transmission.

As described above, the term "blind retransmission" as used herein may generally refer to a retransmission scheme in which a transmitting device blindly performs one or more retransmissions for a transmission without a feedback from a receiving device. Thus, the blind retransmission scheme may include, but not limited to, a proactive k-repetition scheme, a slot aggregation scheme, any other retransmission scheme without a feedback, or the like.

The first device 110 may transmit the first indication via any suitable existing messages in current 3GPP specifications or any newly designed messages. In some embodiments, the first indication may be transmitted via the "d1-DataToUL-ACK" field in configuration information element in the RRC message. Normally, this field can be used to configure a delay between downlink data and an uplink feedback for the data, and a value of this field represents a delay of a number of time slots. Thus, a value currently in use of the field can be used to indicate a candidate retransmission configuration in which a feedback is enabled with a particular delay between the transmission and the feedback.

In addition, a currently non-applicable value of a field in a RRC message can be reserved to indicate a candidate retransmission configuration that is unused in current 3GPP specifications. In particular, an unused value of the "d1-DataToUL-ACK" field in the RRC signaling can be used to indicate a candidate retransmission configuration in which the feedback for a transmission is disabled. For example, value 15 or value 0 of the field may be used to indicate that a HARQ-ACK/NACK feedback is not to be transmitted. The mappings or associations between the "indicative-values" of the field and the candidate retransmission configurations can be broadcast by the first device 110 or setup via RRC signaling.

Alternatively, a newly defined field in the RRC message can be used to indicate various candidate retransmission configurations of the plurality of candidate retransmission configurations 150. For example, a new field of the RRC message for HARQ configurations can be defined to replace the existing field of "d1-DataToUL-ACK" for conveying the first indication of the plurality of candidate retransmission configurations 150. For instance, this new field of the RRC message may be referred to as "d1-DataToUL-ACK-NTN" and it has both the function of indicating the plurality of candidate retransmission configurations 150 and the existing function of the field of "d1-DataToUL-ACK." Alternatively, the new field for the plurality of candidate retransmission configurations 150 (for example, the "d1-DataToUL-ACK-NTN" field) can be used, and the existing field of "d1-DataToUL-ACK" may remain for its current function.

After transmitting 205 the first indication to the second device 120, the first device 110 selects 210 the target retransmission configuration 155 from the plurality of candidate retransmission configurations 150. In some cases, the target retransmission configuration 155 may be selected 210 by the first device 110 based on a condition or property of a transmission between the first device 110 and the second device 120. For example, if a feedback for the transmission provided by the receiving device may result in a large delay, the first device 110 may select a candidate retransmission configuration without a feedback and a retransmission as the target retransmission configuration 155.

As another example, if the transmission requires a high reliability and a feedback may not incur a great delay, the first device 110 can alternatively select a candidate retransmission configuration with a feedback and a retransmission as the target retransmission configuration 155. As a further example, if the transmission requires a high reliability and a feedback may lead to a large delay, the first device 110 can select a candidate retransmission configuration with a blind retransmission as the target retransmission configuration 155.

In some scenarios, it would be beneficial to employ the candidate retransmission configuration in which a feedback is enabled while a retransmission is disabled. This may be the case where the HARQ function is disabled, for example, no data is maintained in the buffer of the receiving device nor a retransmission is expected, but ACK/NACK information can be sent back to the transmitting device for a link adaptation purpose. In this event, in order to reduce signaling overhead for the feedbacks, a criterion may be used for determining whether to enable the feedback function for the transmission.

As an example of the criterion, if the first device 110 or the second device 120 determines that the number of unsuccessfully received transmissions among a predetermined number of transmissions between the first device 110 and the second device 120 exceeds a threshold, the first device 110 can select, a candidate retransmission configuration in which the feedback is enabled and the retransmission is disabled, as the target retransmission configuration 155. The threshold can be predefined or preconfigured according to specific technical environments and design requirements. As another example, in the case that a HARQ process is employed, the criterion may be that if the percentage of NACKs among the feedbacks for the last X transmissions goes above Y, then a feedback may need to be sent to the transmitting device. The specific values of the parameters X and Y may be configurable as RRC parameters.

Continuing with reference to FIG. 2, after selecting 210 the target retransmission configuration 155 from the plurality of candidate retransmission configurations 150, the first device 110 transmits 215 to the second device 120 a second indication of the target retransmission configuration 155. Accordingly, upon receiving the second indication from the first device 110, the second device 120 may know the target retransmission configuration 155 selected by the first device 110.

In other words, the first device 110 indicates the target retransmission configuration 155 to the second device 120 in two stages. In a first stage, the first device 110 transmits 205 the first indication of the plurality of retransmission configurations 150 to the second device 120. In a second stage, the first device 110 may transmit 215 the second indication of the target retransmission configuration 155 to the second device 120. As used herein, such a two stage approach may also be referred to as multi-level indications for a retransmission configuration. With this two stage approach, the flexibility of the retransmission configuration for the first device 110 and the second device 120 can be further improved.

The specific content of the second indication may depend on the manner in which the candidate retransmission configurations 150 as indicated by the first indication are distinguished from each other. For example, if the candidate retransmission configurations 150 have their respective identifiers, the second indication may include the identifier of the target retransmission 155. As another example, the plurality of candidate retransmission configurations 150 may be indexed using respective indexes in the first indication. In this event, the second indication may include an index associated with the target retransmission configuration 155. Upon receiving the index from the first device 110, the second device 120 can know the target retransmission configuration 155 selected by the first device 110. An example of the above-mentioned two stage approach and the indexes for different candidate retransmission configurations will be detailed below with reference to FIG. 3.

Figure 3:
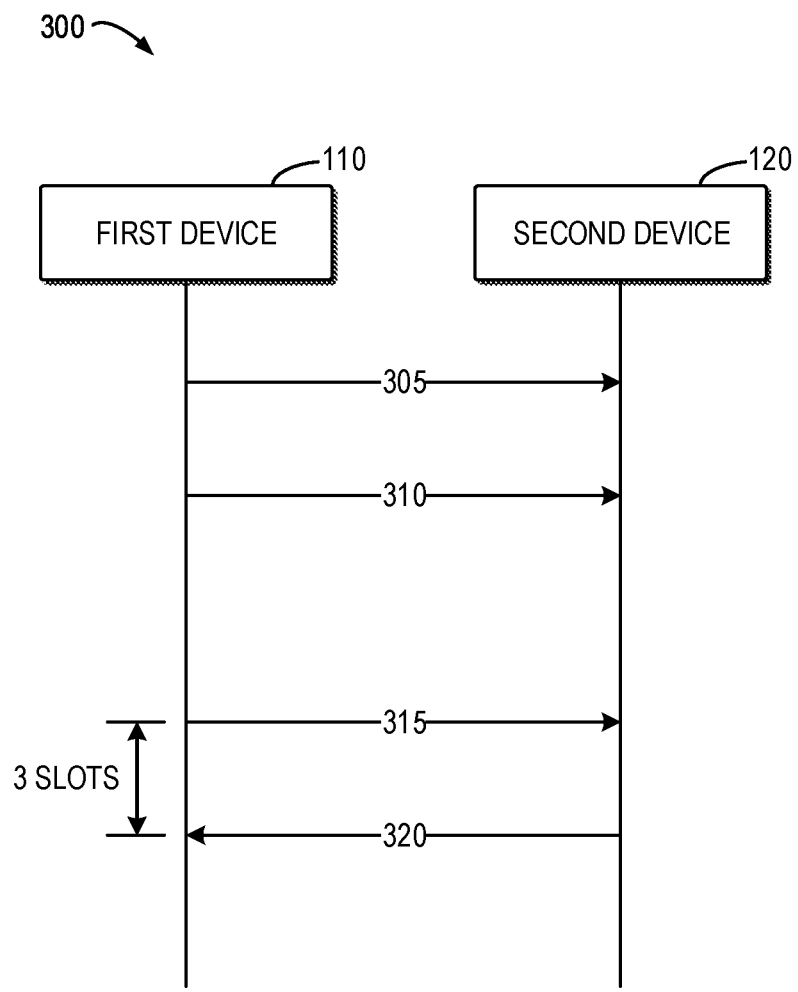
FIG. 3 illustrates another example communication process between a first device and a second device in accordance with some example embodiments of the present disclosure.

FIG. 3 illustrates another example communication process 300 between the first device 110 and the second device 120 in accordance with some example embodiments of the present disclosure. The communication process 300 may be considered as another example embodiment of the communication process 200 as shown in FIG. 2. For the purpose of discussion, the communication process 300 will be described with reference to FIG. 1. However, it would be appreciated that the communication process 300 may be equally applicable to other communication scenarios where two devices communicate with each other.

As shown in FIG. 3, in the first stage, the first device 110 may transmit 305 the first indication of the plurality of candidate retransmission configurations 150 to the second device 120. For example, the first device 110 may send the second device 120 a RRC message with the "d1-DataToUL-ACK" field as defined in the 3GPP specifications. Specifically, if the value of this field is set as 2 by the first device 110 in scheduling a transmission, then the second device 120 may transmit a feedback for the transmission with a delay of 2 time slots after receiving the transmission.

In the case that the "d1-DataToUL-ACK" field is used, an example of the plurality of candidate retransmission configurations 150 transmitted 305 from the first device 110 to the second device 120 may be illustrated in Table 3 as below.

TABLE 3

Example of existing field with newly defined value
RRC: dl-DataToUL-ACK

| First value | 3 |
|---|---|
| Second value | 15 |
| Third value | xx |
| Fourth value | xx |
| Fifth value | xx |
| Sixth value | xx |
| Seventh value | xx |
| Eighth value | xx |

In this particular example of FIG. 3, the first value of the "d1-DataToUL-ACK" field is 3, which may indicate a candidate retransmission configuration in which a feedback for a transmission is enabled and the delay between the feedback and the transmission is set as 3 time slots. In other words, the time gap between receiving a physical downlink shared channel (PDSCH) and sending a corresponding HARQ ACK/NACK feedback is 3 time slots. The second value of the "d1-DataToUL-ACK" field is 15, which is an unused value in existing 3GPP specifications and thus can be used to indicate a candidate retransmission configuration in which the feedback is disabled. It can be pre-configured at the first device 110 and the second device 120 that the value of 15 has the meaning of a HARQ ACK/NACK feedback being disabled.

That is, in this particular example, the first indication transmitted from the first device 110 to the second device 120 indicates 8 candidate retransmission configurations. The first candidate retransmission configuration may indicate that a feedback is enabled with a delay of 3 time slots between the feedback and associated transmission. The second candidate retransmission configuration may indicate that a feedback is disabled. The third to eighth candidate retransmission configurations can be any other candidate retransmission configurations.

Continuing with reference to FIG. 3, for a first transmission between the first device 110 and the second device 120, it is assumed that the first device 110 selects the second candidate retransmission configuration in Table 3 as the target retransmission configuration 155. Therefore, in the second stage, the first device 110 may send the index of the second candidate retransmission configuration to the second device 120. For example, the first device 110 can transmit a "PDSCH-to-HARQ_feedback timing indicator" in the DCI as defined in the 3GPP specifications to the second device 120, where the value of the "PDSCH-to-HARQ_feedback timing indicator" may be set as '001,' which refers to the second value of the "d1-DataToUL-ACK" field in Table 3.

In a similar way, for a second transmission between the first device 110 and the second device 120, it is assumed that the first device 110 selects the first candidate retransmission configuration in Table 3 as the target retransmission configuration 155. Then, in the second stage, the first device 110 may send the index of the first candidate retransmission configuration to the second device 120. For example, the first device 110 can transmit the "PDSCH-to-HARQ_feedback timing indicator" to the second device 120 by DCI signaling, where the value of "PDSCH-to-HARQ_feedback timing indicator" may be set as '000,' which refers to the first value of the "dl-DataToUL-ACK" field in Table 3. It can be seen that this approach described with reference to FIG. 3 is fully dynamic and does not require an RRC reconfiguration message to repurpose the HARQ processes, because the HARQ behavior may be changed on-the-fly for each transmitted transmission block (TB).

In some example embodiments, the indexes of the plurality of candidate retransmission configurations 150 can be also used to index a plurality of retransmission parameter configurations. In other words, the first device 110 may transmit, to the second device 120, the plurality of retransmission parameter configurations, which are indexed by the indexes of the plurality of candidate retransmission configurations 150. Accordingly, the second device 120 may receive, from the first device 110, the plurality of retransmission parameter configurations indexed by the indexes of the plurality of candidate retransmission configurations 150.

That is, the plurality of candidate retransmission configurations 150 and the plurality of retransmission parameter configurations are indexed using common indexes. This may be the case that the new field for the plurality of candidate retransmission configurations 150 (for example, the "dl-DataToUL-ACK-NTN" field) is used, the existing "dl-DataToUL-ACK" field still remains, and they share same index information which can be sent by DCI signaling. With such common indexes, the indication overhead for indicating respective retransmission configurations from the plurality of candidate retransmission configurations 150 and the plurality of retransmission parameter configurations can be reduced. An example of the common indexes will be detailed below with reference to FIG. 4.

Figure 4:
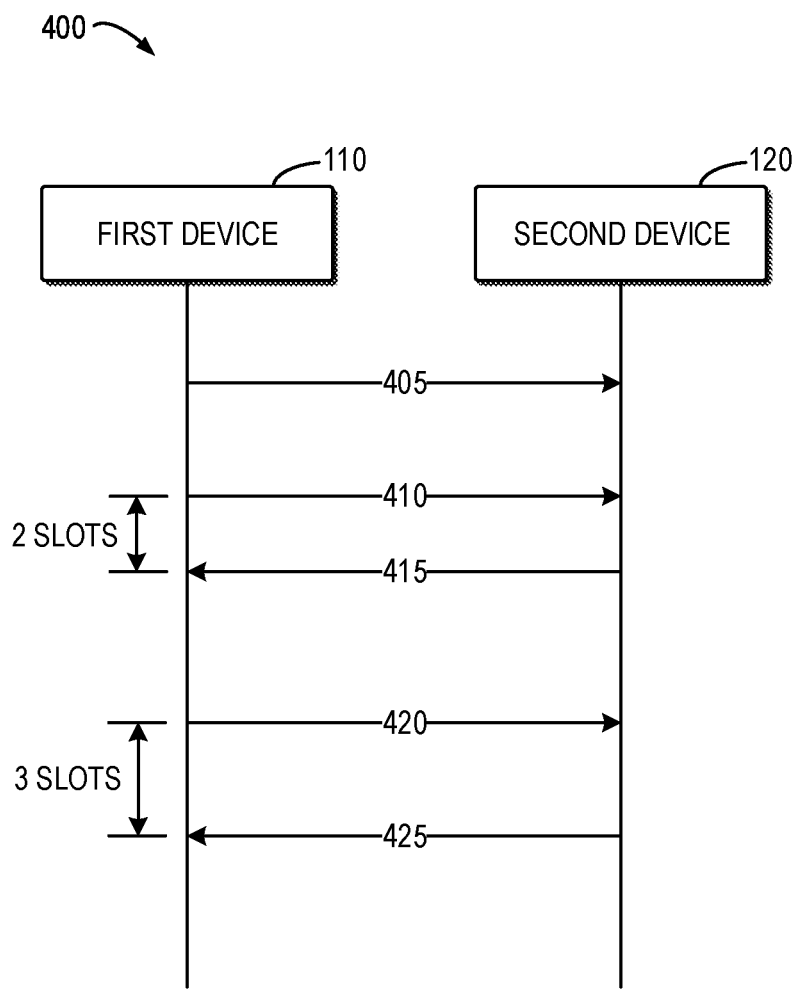
FIG. 4 illustrates another example communication process between a first device and a second device in accordance with some example embodiments of the present disclosure.

FIG. 4 illustrates another example communication process 400 between the first device 110 and the second device 120 in accordance with some example embodiments of the present disclosure. The communication process 400 may be considered as another example embodiment of the communication process 200 as shown in FIG. 2. For the purpose of discussion, the communication process 400 will be described with reference to FIG. 1. However, it would be appreciated that the communication process 400 may be equally applicable to other communication scenarios where two devices communicate with each other.

As shown in FIG. 4, the first device 110 can transmit 405 to the second device 120 the first indication of the plurality of candidate retransmission configurations 150 and the plurality of retransmission parameter configurations. For example, the first device 110 may send the "dl-DataToUL-ACK" field and the "HARQ retransmission indication" field to the second device 120 by RRC signaling. In other words, in the particular example of FIG. 4, the plurality of candidate retransmission configurations 150 may be indicated in the "HARQ retransmission indication" field, and the plurality of retransmission parameter configurations may be indicated in the "dl-DataToUL-ACK" field. In this case, an example of the plurality of candidate retransmission configurations 150 and the plurality of retransmission parameter configurations indexed using same indexes may be illustrated in Table 4 as below.

TABLE 4

Example of two fields indexed using common indexes

| RRC: HARQ retransmission | RRC: dl-DataToUL-ACK |
|---|---|
| First value: 1 | First value: 3 |
| Second value: 0 | Second value: 2 |
| Third value: xx | Third value: xx |
| Fourth value: xx | Fourth value: xx |
| Fifth value: xx | Fifth value: xx |
| Sixth value: xx | Sixth value: xx |
| Seventh value: xx | Seventh value: xx |
| Eighth value: xx | Eighth value: xx |

In this particular example of FIG. 4, the first value of the "HARQ retransmission indication" field is 1, which indicates that the HARQ retransmission is enabled. The second value of the "HARQ retransmission indication" field is 0, which indicates that the HARQ retransmission is disabled. That is, in this example, the first indication transmitted from the first device 110 to the second device 120 indicates 8 candidate retransmission configurations. The first candidate retransmission configuration may be that the HARQ retransmission is enabled, and the second candidate retransmission configuration may be that the HARQ retransmission is disabled. The third to eighth candidate retransmission configurations can be any other candidate retransmission configurations.

In addition, the first value of the "dl-DataToUL-ACK" field is 3, which means that the time gap between receiving the PDSCH and sending the corresponding HARQ ACK/NACK feedback is 3 time slots. The second value of the "dl-DataToUL-ACK" field is 2, which means that the time gap between receiving the PDSCH and sending the corresponding HARQ ACK/NACK feedback is 2 time slots. That is, in this example, the plurality of retransmission parameter configurations includes 8 retransmission parameter configurations. The first retransmission parameter configuration indicates a delay of 3 time slots between a feedback and its associated transmission, and the second retransmission parameter configuration indicates a delay of 2 time slots between a feedback and its associated transmission. The third to retransmission parameter configurations can be any other retransmission parameter configurations.

Continuing with reference to FIG. 4, for a first transmission between the first device 110 and the second device 120, the first device 110 can select the target retransmission configuration 155 in which the feedback for the transmission is enabled, the retransmission is disabled, and the above-mentioned time gap is 2 time slots. Accordingly, the first device 110 may send 410 to the second device 120 an index associated with both the second value of the "HARQ retransmission" field and the second value of the "dl-DataToUL-ACK" field. For example, the first device 110 can send to the second device 120 the "PDSCH-to-HARQ_feedback timing indicator" by DCI signaling, where the value of the "PDSCH-to-HARQ_feedback timing indicator" may be '001,' which indicates the second value of the "HARQ retransmission" field in Table 4, and also indicates the second value of the "dl-DataToUL-ACK" field in Table 4.

In a similar manner, for a second transmission between the first device 110 and the second device 120, the first device 110 can select the target retransmission configuration 155 in which the feedback for the transmission is enabled, the retransmission is enabled, and the above-mentioned time gap is 3 time slots. Accordingly, the first device 110 may sends 420 to the second device 120 an index associated with both the first value of the "HARQ retransmission" field and the first value of the "d1-DataToUL-ACK" field. For example, the first device 110 can send to the second device 120 the "PDSCH-to-HARQ_feedback timing indicator" by DCI signaling, where the value of the "PDSCH-to-HARQ_ feedback timing indicator" may be '000,' which indicates the first value of the "HARQ retransmission" field in Table 4, and also indicates the first value of the "d1-DataToUL-ACK" field in Table 4.

It can be seen that similar to the approach described with reference to FIG. 3, this approach as described with reference to FIG. 4 is also fully dynamic and does not require an RRC reconfiguration message to repurpose the HARQ processes, because the HARQ behavior may be changed on-the-fly for each transmitted TB. In addition, the approach has more capability to support more new features compared to that described with reference to FIG. 3.

As an alternative to the common indexes for both the plurality of candidate retransmission configurations 150 and the plurality of retransmission parameter configurations, the new field for the plurality of candidate retransmission configurations 150 (for example, the "d1-DataToUL-ACK-NTN" field) and the existing "d1-DataToUL-ACK" field can have their different respective indexes, which can both be sent by DCI signaling. In a further example embodiment, the new field for the plurality of candidate retransmission configurations 150 (for example, the "d1-DataToUL-ACK-NTN" field) can be used for some special cases, while the values of the existing "d1-DataToUL-ACK" field can be dynamically indicated by DCI signaling. For example, the RRC signaling may configure HARQ retransmissions as disabled for all HARQ processes, and the DCI signaling can dynamically indicate that the HARQ ACK/NACKs are disabled for each HARQ process.

In addition, in both the two examples of the two stage approach as shown in FIGS. 3 and 4, the first device 110 can transmit, to the second device 120, the first indication of the plurality of candidate retransmission configurations 150 via a RRC message. Then, the first device 110 may transmit, to the second device 120, the second indication of the target retransmission configuration 155 via a DCI. Accordingly, the second device 120 can receive, from the first device 110, the first indication of the plurality of candidate retransmission configurations 150 via the RRC message, and further receive, from the first device 110, the second indication of the target retransmission configuration 155 via the DCI.

In this way, the example embodiments of the present disclosure can take full advantage of the existing messages as defined in the 3GPP specifications. However, it is to be understood that the RRC message and the DCI are merely examples without suggesting any limitation as to the scope of the disclosure. In other example embodiments, the plurality of candidate retransmission configurations 150 and the indication of the target retransmission configuration 155 can be transmitted via any existing or future messages.

Further, it is to be understood that the specific messages, the specific fields, the specific values of the fields, the specific number of the fields, or the like as described with reference to FIGS. 3 and 4 are only for the purpose of illustration without suggesting any limitations. The example embodiments of the present disclosure may be equally applicable to other scenarios in which any other messages, any other fields, any other values of the fields, any other number of the fields, or the like are employed.

In some example embodiments, each of the plurality of candidate retransmission configurations 150 may be associated with a HARQ process as defined in the 3GPP specifications. In this event, the plurality of candidate retransmission configurations 150 and the target retransmission configuration 155 may be applicable to individual HARQ processes. For example, in a candidate retransmission configuration for a HARQ process, a HARQ ACK/NACK feedback function may be enabled for a HARQ process. In another candidate retransmission configuration for a HARQ process, a HARQ ACK/NACK feedback function may be disabled for a HARQ process. This means that the HARQ retransmission function can be enabled or disabled by default, and the HARQ ACK/NACK feedback function can be enabled or disabled by the first device 110.

In a further candidate retransmission configuration for a HARQ process, a HARQ retransmission function may be enabled for a HARQ process. In a still further candidate retransmission configuration for a HARQ process, a HARQ retransmission function being disabled for a HARQ process. This means that the HARQ ACK/NACK feedback function can be enabled or disabled by default, and the HARQ retransmission function can be enabled or disabled by the first device 110. This may be advantageous in that two-way delay between the first device 110 and the second device 120 may be great, for example, about 500 ms. If the first device 110 can indicate disabling of the HARQ retransmission function, then the second device 120 does not need to restore the data for a long time, for example, 500 ms.

Additionally, in a candidate retransmission configuration for a HARQ process, both a HARQ ACK/NACK feedback function and a HARQ retransmission function may be enabled for a HARQ process. In another candidate retransmission configuration for a HARQ process, a HARQ ACK/NACK feedback function may be enabled and a HARQ retransmission function may be disabled for a HARQ process. In yet another candidate retransmission configuration for a HARQ process, both a HARQ ACK/NACK feedback function and a HARQ retransmission function may be disabled for a HARQ process. This means that both of the HARQ ACK/NACK feedback function and the HARQ retransmission function can be enabled or disabled by the first device 110.

In a further candidate retransmission configuration for a HARQ process, a HARQ ACK/NACK feedback function may be enabled, a HARQ retransmission function may be disabled, and a blind retransmission function may be enabled for a HARQ process. In a still further candidate retransmission configuration for a HARQ process, both a HARQ ACK/NACK feedback function and a HARQ retransmission function may be disabled, and a blind retransmission function may be enabled for a HARQ process. With the target retransmission configurations 155 for a HARQ process, the first device 110 does not need to configure respective retransmission configurations for individual transmissions associated with a HARQ process, thereby reducing the indication overhead for indicating the retransmission configurations for the transmissions associated with a same HARQ process.

In some cases, for either or both of the downlink transmissions and uplink transmissions, the first device 110 can use existing or newly defined RRC signaling to implicitly or explicitly indicate the plurality of candidate retransmission configurations 150 and the target retransmission configuration 155 associated with a HARQ process. Moreover, different HARQ processes between the first device 110 and the second device 120 can be indicated by the serial numbers of these HARQ processes, identifiers (IDs) of these HARQ processes, and/or a new time-related function. An example of using retransmission configurations for HARQ processes will be detailed below with reference to FIG. 5.

Figure 5:
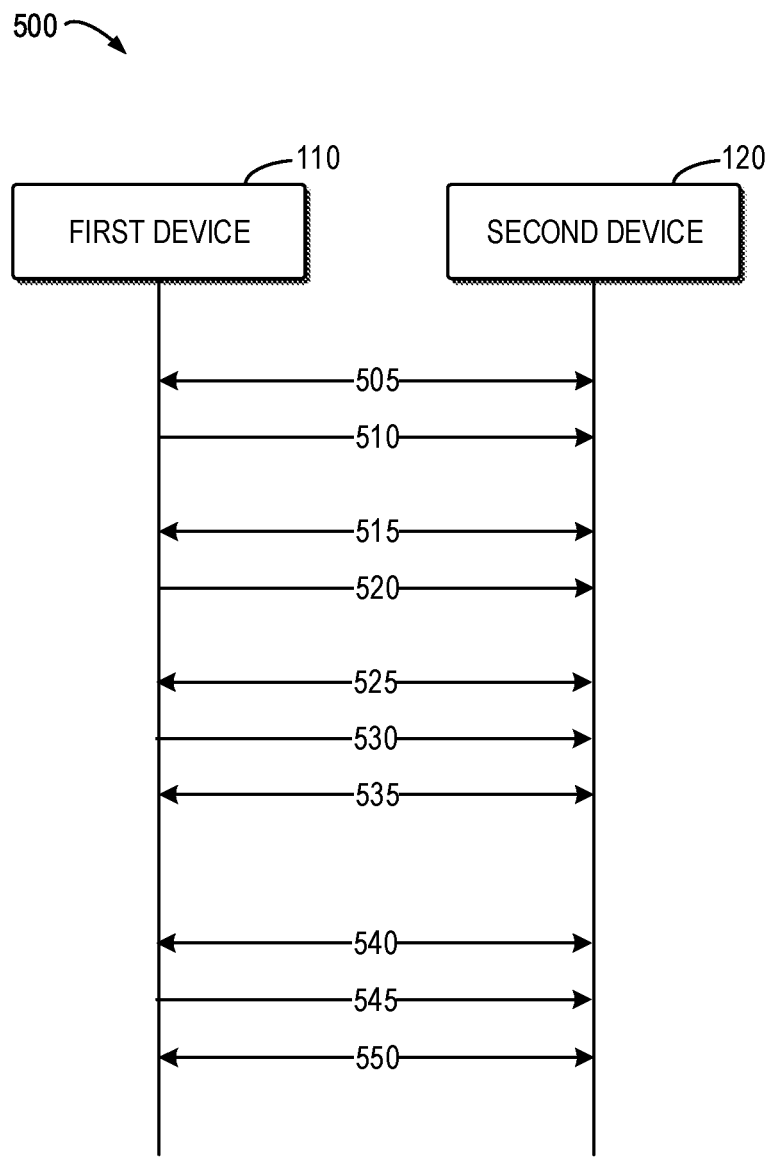
FIG. 5 illustrates another example communication process between a first device and a second device in accordance with some example embodiments of the present disclosure.

FIG. 5 illustrates another example communication process 500 between the first device 110 and the second device 120 in accordance with some example embodiments of the present disclosure. The communication process 500 may be considered as another example embodiment of the communication process 200 as shown in FIG. 2. For the purpose of discussion, the communication process 500 will be described with reference to FIG. 1. However, it would be appreciated that the communication process 500 may be equally applicable to other communication scenarios where two devices communicate with each other.

As shown in FIG. 5, the second device 120 attaches 505 to the first device 110. In this phase, there is still no active connection between the first device 110 and the second device 120. During the attachment, the first device 110 and the second device 120 may follow all the legacy procedures as defined in the 3GPP specifications.

After the attachment of the second device 120 to the first device 110, the first device 110 broadcasts 510 initial (or default) retransmission configurations of HARQ processes in the cell supported by the first device 110. Thereby, the second device 120 can know the initial retransmission configurations for the HARQ processes between the first device 110 and the second device 120. In this example, the default retransmission configurations may be that all the HARQ processes are disabled. That is, for all the HARQ processes associated with the first device 110 and the second device 120, both the HARQ feedback function and the HARQ retransmission function are disabled.

For example, for either of the downlink transmissions and the uplink transmissions, a total number of 16 HARQ processes are disabled. It is noted that the broadcast of the initial retransmission configurations by the first device 110 may be an optional operation. In other example embodiments, instead of the broadcast, the first device 110 may inform the second device 120 of one or more current retransmission configurations of one or more HARQ processes by a RRC message in a later stage.

At some time point, the second device 120 initiates 515 a first application and moves to the connected state. This first application involves communications with the first device 110. In this case, the first application is a non-critical application with payload in bursts (for instance, Facebook) and, as such, the first device 110 may decide to maintain all the 16 HARQ processes disabled, without any modification on the current (default) retransmission configurations. If the first device 110 does not broadcast 510 the default retransmission configurations of the HARQ processes, the first device 110 at this stage may need to inform 520 the second device 120, by the occasion of the change to the connected state, that the 16 HARQ processes are disabled.

Continuing with reference to FIG. 5, the second device 120 initiates 525 a second application, which may be a mission-critical application and involves communications with the first device 110. For example, the QoF of the second application indicates that the latency for the second application should be kept to a minimum. Due to the nature of the second application, the first device 110 may decide to activate some HARQ processes. As the first application is still available and cannot use enabled HARQ processes due to the problem of great delay, the first device 110 can decide to activate 4 (out of 16) HARQ processes in both the uplink transmissions and the downlink transmissions. Then, the first device 110 can inform 530 the second device 120 of the new retransmission configurations for the HARQ processes, for example, via an RRC reconfiguration message.

Further, the second device 120 initiates 540 a third application which involves communications with the first device 110. In this example, the third application may correspond to an upload of a video recording for navigation. The first device 110 may understand that the third application can be a mission critical application in the uplink, and can therefore decide to enable more HARQ processes. For example, the first device 110 may enable 8 more (total of 12) uplink HARQ processes, while only 8 downlink HARQ processes are kept as enabled. Then, the first device 110 can inform 545 the second device 120 of the new retransmission configurations for the HARQ processes, for example, via an RRC reconfiguration message.

In the example embodiment of FIG. 5, one x-bit message can be used for indicating the enabling state or the disabling state of the individual HARQ processes. As an example, $2^x$ may be the number of HARQ processes available between the first device 110 and the second device 120. In current 5G NR standards, x=4. That is, for 16 HARQ processes between the first device 110 and the second device 120, a 4-bit message can indicate the state of a particular HARQ processes. As another example, one bit can be configured for one HARQ process, and thus 16 bits can be used for indicating the states of the 16 HARQ processes.

In some example embodiments, instead of using an indication for indicating the state of an individual HARQ process, the first device 110 can employ an indication of retransmission configurations for a plurality of HARQ processes. For example, the first device 110 may transmit, to the second device 120, an indication that all of the HARQ processes between the first device 110 and the second device 120 are enabled. As another example, the indication may indicate that all of the HARQ processes are disabled. As a further example, the indication may indicate that a part of the HARQ processes are disabled and the rest of the HARQ processes are enabled. Upon receiving such an indication from the first device 110, the second device 120 may determine the retransmission configurations of the plurality of HARQ processes. In this way, the indication overhead for indicating the retransmission configurations for a plurality of HARQ processes can be reduced.

More specifically, it is assumed that the above indication includes a sequence of two bits, and the bitmap may be interpreted as follows. The value "00" of the bitmap may indicate that all HARQ processes are enabled. The value of "01" of the bitmap may indicate that HARQ processes associated with transmissions in even-numbered TTIs are disabled, while HARQ processes in other TTIs are enabled. The value of "11" of the bitmap may indicate that all HARQ processes are disabled.

Additionally, the value of "10" of the bitmap may indicate that HARQ processes for which $mod_x(H_{id}+F_n*k)$ are disabled, where k and x are constants, $H_{id}$ represents the HARQ process ID, and $F_n$ represents the system frame number. For instance, for a codebook larger than 2 bits, there may be multiple entries for k and x values. For example, if $H_{id}=2$ and $mod_x(H_{id}+F_n*k)=12$, then the virtual HARQ process 12 will be disabled, where HARQ process ID 2 is sent by DCI signaling.

This approach is one extension solution for HARQ process ID extension. Currently, there are only 16 HARQ process IDs, which may be not enough for scenarios in non-terrestrial networks. Therefore, such an approach can indicate more HARQ processes, namely, new virtual HARQ processes. In addition, since the indication information of the HARQ disabled/enabled state is related to a time range, such as, depending on the system frame numbers, these HARQ processes may be termed as time-related HARQ processes herein. Accordingly, a function for determining one of the time-related HARQ processes can be referred to as a time-related function.

It is to be understood that the specific number of HARQ processes, the specific IDs of the HARQ processes, the specific applications, the specific messages, or the like as described with reference to FIG. 5 are only for the purpose of illustration without suggesting any limitations. The example embodiments of the present disclosure may be equally applicable to other scenarios in which any other number of HARQ processes, any other IDs of the HARQ processes, any other applications, any other messages, or the like are employed. Another example of the indication for a plurality of HARQ processes will be detailed below with reference to FIG. 6.

Figure 6:
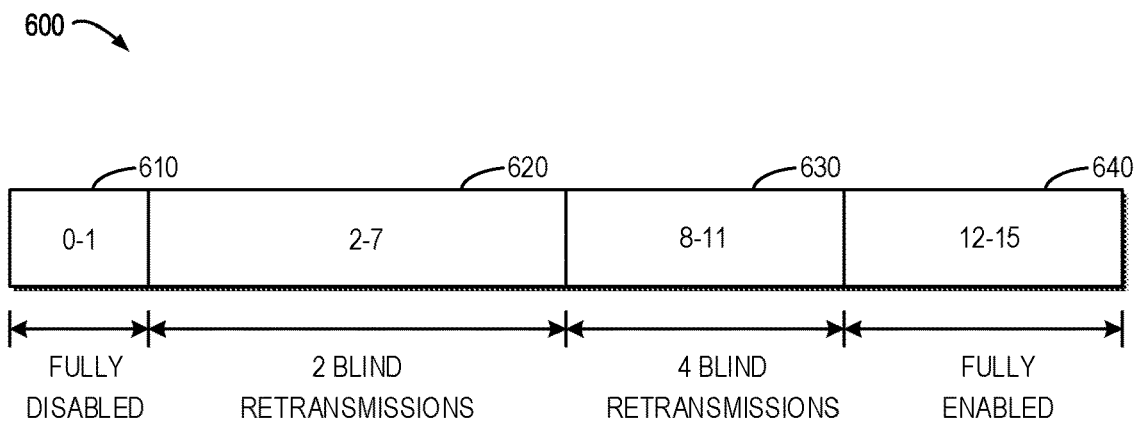
FIG. 6 illustrates an example configuration in which different HARQ processes are configured with different retransmission configurations in accordance with some example embodiments of the present disclosure.

FIG. 6 illustrates an example configuration 600 in which different HARQ processes are configured with different retransmission configurations in accordance with some example embodiments of the present disclosure. As shown in FIG. 6, it is assumed that there are 16 HARQ processes associated with the first device 110 and the second device 120. The 16 HARQ processes are numbered as HARQ process 0 to HARQ process 15. The first device 110 may transmit to the second device 120 a RRC message which conveys a list of different retransmission configurations for different HARQ processes. These retransmission configurations contain other options in addition to just enabling or disabling the HARQ process. Thus, a few more bits in the RRC message may be used to indicate these retransmission configurations.

In the particular example of FIG. 6, HARQ processes 0-1 which are referenced as 610 are fully disabled, which means that they are disabled and no blind retransmission is configured for them. HARQ processes 2-7 which are referenced as 620 are disabled, and proactive K retransmissions are configured for them, where K=2. HARQ processes 8-11 which are referenced as 630 are disabled, and proactive K retransmissions are configured for them, where K=4. HARQ processes 12-15 which are referenced as 640 are enabled as in the legacy 3GPP standards. By using a blind retransmission scheme, such as the proactive K retransmissions (or repetitions), the performance of the transmissions between the first device 110 and the second device 120 may still be enhanced by soft combining of the K-repetitions in the buffer of the receiving device, even if the feedback function (ACK/NACK) may be disabled.

It is to be understood that the specific number of HARQ processes, the specific IDs of the HARQ processes, the specific retransmission configurations for the HARQ processes, or the like as described with reference to FIG. 6 are only for the purpose of illustration without suggesting any limitations. The example embodiments of the present disclosure may be equally applicable to other scenarios in which any other number of HARQ processes, any other IDs of the HARQ processes, any other retransmission configurations for the HARQ processes, or the like are employed.

In some example embodiments, individual service data flows to be transmitted between the first device 110 and the second device 120 can be associated with respective HARQ processes with different retransmission configurations. In particular, the first device 110 can transmit, to the second device 120, an indication of the retransmission configuration of the HARQ process for an individual service data flow. Accordingly, the second device 120 may receive the indication from the first device 110, and then can transmit the service data flow to the first device 110 based on the indication from the first device 110. In this way, the granularity of the retransmission configuration can be refined to the level of service data flow, thereby further improving the flexibility of the retransmission configurations.

For example, the indication may indicate a service data flow to be transmitted using a HARQ process with an enabled HARQ retransmission function. Additionally or alternatively, the indication may indicate a service data flow to be transmitted using a HARQ process with a disabled HARQ retransmission function. Additionally or alternatively, the indication may indicate a service data flow to be transmitted using a HARQ process with an enabled blind retransmission function.

In other words, the indication may indicate which uplink flows may need to be transmitted in an enabled HARQ process, and which uplink flows cannot to be transmitted in an enabled HARQ process. In addition, the indication may indicate which uplink flows may need to support a retransmission even if the HARQ process is disabled. In some example embodiments, the first device 110 can use new RRC signaling to implicitly or explicitly indicate the information related to the service data flows. It is further noted that the solution of implicitly indicating a disabled HARQ process also includes the solution of disabling the HARQ feedback function in general but enabling it from time-to-time. Moreover, the first device 110 can use the RRC reconfiguration message to indicate which uplink flows need to be transmitted in an enabled HARQ process and which uplink flows cannot be transmitted in an enabled HARQ process.

The mapping of uplink flows to the enabled HARQ processes can be configured to the second device 120 for the instruction of multiplexing. For example, the second device 120 can only include the data from the radio bearer or service mapped to the enabled HARQ processes in the medium access control (MAC) protocol data unit (PDU) transmitted in the enabled HARQ processes.

This can be explained with an example as follows. The HARQ enabling can be supported for certain types of service, for example, certain types of radio bearer. This can be configured by the first device 110 through RRC signaling for the configuration of radio bearer parameters. Each radio bearer can be configured with an enabled HARQ process or a disabled HARQ process. For instance, data radio bearer 1 (DRB1) may be configured with HARQ process 1 which is enabled. At the side of second device 120, when the grant for the enabled HARQ process (for example, HARQ process 1) is received, the second device 120 can form the MAC PDU with the radio link control (RLC) PDU from the radio bearers configured with the enabled HARQ process, for example, the data from DRB1 can be transmitted on HARQ process 1.

If the grant for a disabled HARQ process (or other retransmission scheme) is received, for example, the grant on HARQ process 2 (which is disabled) is received, the second device 120 cannot put the RLC PDU from the radio bearer configured with an enabled HARQ process into the MAC PDU. That is, the data from DRB1 cannot be transmitted in HARQ process 2.

Alternatively, it is assumed that the second device 120 receives from the first device 110 an indication of a service data flow to be transmitted using a HARQ process with an enabled HARQ retransmission function, and the second device 120 determines that the second indication indicates a HARQ process with a disabled HARQ retransmission function. In this event, the second device 120 can enable the disabled HARQ retransmission function of the HARQ process. That is, the second device 120 can change the state of the HARQ retransmission function of the HARQ process. Then, the second device 120 may transmit the service data flow using the HARQ process with the HARQ retransmission function which is enabled by it. In this event, the second device 120 may transmit, to the first device 110, an indication that the HARQ retransmission function of the HARQ process is enabled. That is, the second device 120 informs the first device 110 that the state of the HARQ retransmission function of this HARQ process is changed by the second device 120.

More specifically, if the grant for a disabled HARQ process (or other retransmission scheme) is received, for example, the grant on HARQ process 2 (which is disabled) is received, the second device 120 may put the RLC PDU from the radio bearer configured with the enabled HARQ process into the MAC PDU, but then enable this HARQ process. Afterwards, the second device 120 may send an indication to the first device 110 indicating that the HARQ process 2 is enabled. That is, the data from DRB1 can be transmitted in HARQ process 2 but HARQ process 2 is enabled with HARQ functions, and the first device 110 is informed that HARQ process 2 is enabled.

As another example of the retransmission configuration of a HARQ process associated with an individual service data flow, with reference to FIG. 5, the first device 110 may indicate to the second device 120 that a service data flow corresponding to the first application is to be streamed in a disabled HARQ process (for example, in the uplink), while a service data flow corresponding to the second application is to be transmitted in an enabled HARQ process, since the second application is a mission critical application.

Referring back to FIG. 2, after transmitting 215 to the second device 120 the information of the target retransmission configuration 155, the first device 110 may communicate 220 with the second device 120 using the target retransmission configuration 155. From the perspective of the second device 120, after receiving 215 the information of the target retransmission configuration 155 from the first device 110, the second device 120 can communicate 220 with the first device 110 using the target retransmission configuration 155.

In particular, it is assumed that a transmission is performed from the first device 110 to the second device 120, such as a downlink transmission, if the first device 110 is a network device and the second device 120 is a terminal device. In case the target retransmission configuration 155 indicates that a feedback and a retransmission are enabled for the transmission, then the second device 120 may transmit to the first device 110 a feedback indicating whether the transmission is successfully received by the second device 120. If the second device 120 successfully receives the transmission, the first device 110 may not perform a retransmission. Otherwise, if the second device 120 unsuccessfully receives the transmission, the first device 110 may perform a retransmission.

In case the target retransmission configuration 155 indicates that the feedback is enabled and the retransmission is disabled, then the second device 120 may transmit to the first device 110 the feedback indicating whether the transmission is successfully received by the second device 120. In this case, the first device 110 may not perform a retransmission, regardless of the feedback from the second device 120. That is, even if the feedback provided by the second device 120 indicates a failed reception, the first device 110 is not to perform a retransmission.

In case the target retransmission configuration 155 indicates that both the feedback and the retransmission for the transmission are disabled, then the second device 120 may not transmit to the first device 110 the feedback for the transmission, and the first device 110 may not perform a retransmission. In case the target retransmission configuration 155 indicates that a blind retransmission is enabled for the transmission, then the first device 110 may perform one or more retransmissions without the feedback from the second device 120 for the transmission.

In a similar manner, it is assumed that a transmission is performed from the second device 120 to the first device 110, such as an uplink transmission, if the first device 110 is a network device and the second device 120 is a terminal device. In this event, in a manner similar to that described for a downlink transmission, the first device 110 and the second device 120 can communicate with each other based on the target retransmission configuration 155. The differences are that the transmitting device of a feedback is changed from the second device 120 to the first device 110, and the retransmission may be performed by the second device 120 instead of the first device 110.

More specifically, with reference to FIG. 3, after the first device 110 transmitting 310 the index of the second value of the "d1-DataToUL-ACK" field in Table 3, which indicates that the HARQ ACK/NACK feedback is disabled. The first device 110 does not expect a corresponding HARQ ACK/NACK feedback from the second device 120 and does not schedule a corresponding HARQ retransmission to the second device 120. From the perspective of the second device 120, it does not send back to the first device 110 a HARQ ACK/NACK of the PDSCH corresponding to the PDCCH carrying the DCI signaling transmitted by the first device 110. Also, the second device 120 does not expect a corresponding HARQ retransmission from the first device 110.

In contrast, after the first device 110 transmitting 315 the index of the first value of the "d1-DataToUL-ACK" field in Table 3, which indicates that the HARQ ACK/NACK feedback is enabled and the time gap between receiving the PDSCH and sending the corresponding HARQ ACK/NACK feedback is 3 time slots. Then, three time slots after receiving the PDSCH, the second device 120 sends 320 back to the first device 110 the HARQ ACK/NACK of the PDSCH corresponding to PDCCH carrying the DCI signaling transmitted by the first device 110.

In addition, with reference to FIG. 4, after the first device 110 transmitting 410 the index of the second value of the "HARQ retransmission" field and the second value of the "d1-DataToUL-ACK" field as shown in Table 4, which indicate that the HARQ retransmission is disabled and the time gap between receiving the PDSCH and sending the corresponding HARQ ACK/NACK feedback is 2 time slots, then the first device 110 does expect a corresponding HARQ ACK/NACK feedback from the second device 120 but does not schedule a corresponding HARQ retransmission to the second device 120.

At the side of the second device 120, two time slots after receiving the PDSCH, it sends 415 back to the first device 110 the HARQ ACK/NACK of the PDSCH corresponding to the PDCCH carrying the DCI signaling transmitted by the first device 110. Additionally, the second device 120 does not expect a corresponding HARQ retransmission from the first device 110 even if the feedback information from the second device 120 is a HARQ NACK.

In contrast, after the first device 110 transmitting 420 the index of the first value of the "HARQ retransmission" field and the first value of the "d1-DataToUL-ACK" field as shown in Table 4, which indicate that the HARQ retransmission is enabled and the time gap between receiving the PDSCH and sending the corresponding HARQ ACK/NACK feedback is 3 time slots, then three time slots after receiving the PDSCH, the second device 120 sends 425 back to the first device 110 the HARQ ACK/NACK of the PDSCH corresponding to the PDCCH carrying the DCI signaling transmitted by the first device 110, and expects a corresponding HARQ retransmission from the first device 110 if the feedback information from the second device 120 is a HARQ ACK.

Further, with reference to FIG. 5, after the first device 110 informs 530 the second device 120 of the new retransmission configurations for the HARQ processes due to the second application, both the first device 110 and the second device 120 can update 535 their RRC configurations to reflect the current retransmission configurations of the HARQ processes. In this event, the DCI indexes can still mark the HARQ processes with serial numbers 0-15, but some of those are treated by the second device 120 as disabled and vice-versa.

Analogously, after the first device 110 informs 545 the second device 120 of the new retransmission configurations for the HARQ processes due to the third application, both the first device 110 and the second device 120 can update 550 their RRC configurations to reflect the current retransmission configurations of the HARQ processes. For example, the numbers of uplink and downlink HARQ buffers are updated in both the uplink and the downlink.

Figure 7:
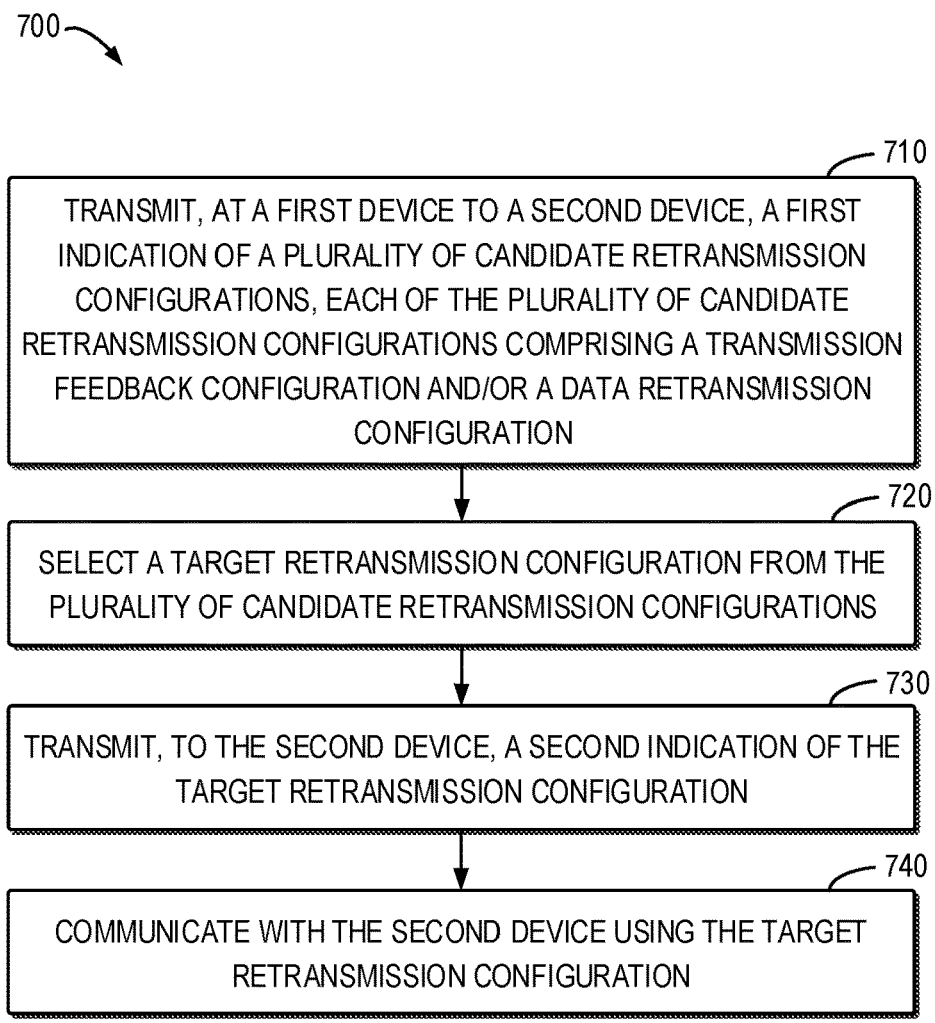
FIG. 7 illustrates a flowchart of an example method in accordance with some example embodiments of the present disclosure.

FIG. 7 illustrates a flowchart of an example method 700 in accordance with some example embodiments of the present disclosure. In some example embodiments, the method 700 can be implemented at a device in a communication network, such as the first device 110 as shown in FIG. 1. Additionally or alternatively, the method 700 can also be implemented at other devices shown in FIG. 1. In some other example embodiments, the method 700 may be implemented at devices not shown in FIG. 1.

At block 710, a first device transmits, to a second device, a first indication of a plurality of candidate retransmission configurations, each of the plurality of candidate retransmission configurations comprising a transmission feedback configuration and/or a data retransmission configuration. At block 720, the first device selects a target retransmission configuration from the plurality of candidate retransmission configurations. At block 730, the first device transmits, to the second device, a second indication of the target retransmission configuration. At block 740, the first device communicates with the second device using the target retransmission configuration.

In some example embodiments, the plurality of candidate retransmission configurations are indexed using respective indexes, and the second indication comprises an index associated with the target retransmission configuration.

In some example embodiments, the method 700 further comprises: transmitting, to the second device, a plurality of retransmission parameter configurations being indexed by the indexes of the plurality of candidate retransmission configurations.

In some example embodiments, the first indication is transmitted via a RRC message, and the second indication is transmitted via a DCI.

In some example embodiments, the plurality of candidate retransmission configurations comprising at least one of the following: a feedback being enabled for a transmission, a feedback being disabled for a transmission, a data retransmission being enabled for a transmission, a data retransmission being disabled for a transmission, a feedback and a data retransmission being enabled for a transmission, a feedback being enabled and a data retransmission being disabled for a transmission, a feedback and a data retransmission being disabled for a transmission, or a blind retransmission being enabled for a transmission.

In some example embodiments, the plurality of candidate retransmission configurations comprises at least one of the following: a HARQ ACK/NACK feedback function being enabled for a HARQ process, a HARQ ACK/NACK feedback function being disabled for a HARQ process, a HARQ retransmission function being enabled for a HARQ process, a HARQ retransmission function being disabled for a HARQ process, a HARQ ACK/NACK feedback function and a HARQ retransmission function being enabled for a HARQ process, a HARQ ACK/NACK feedback function being enabled and a HARQ retransmission function being disabled for a HARQ process, a HARQ ACK/NACK feedback function and a HARQ retransmission function being disabled for a HARQ process, a HARQ ACK/NACK feedback function being enabled, a HARQ retransmission function being disabled, and a blind retransmission function being enabled for the HARQ process, or a HARQ ACK/NACK feedback function and a HARQ retransmission function being disabled, and a blind retransmission function being enabled for a HARQ process.

In some example embodiments, the method 700 further comprises transmitting, to the second device, an indication of one of the following: all of HARQ processes between the first device and the second device being enabled; all of the HARQ processes being disabled; or a part of the HARQ processes being disabled and the rest of the HARQ processes being enabled.

In some example embodiments, the method 700 further comprises transmitting, to the second device, an indication of at least one of the following: a service data flow to be transmitted using a HARQ process with an enabled HARQ retransmission function, a service data flow to be transmitted using a HARQ process with a disabled HARQ retransmission function, or a service data flow to be transmitted using a HARQ process with an enabled blind retransmission function.

In some example embodiments, selecting the target retransmission configuration comprises: in accordance with a determination that the number of unsuccessfully received transmissions among a predetermined number of transmissions between the first device and the second device exceeds a threshold, selecting the candidate retransmission configuration that the feedback is enabled and the retransmission is disabled as the target retransmission configuration.

Figure 8:
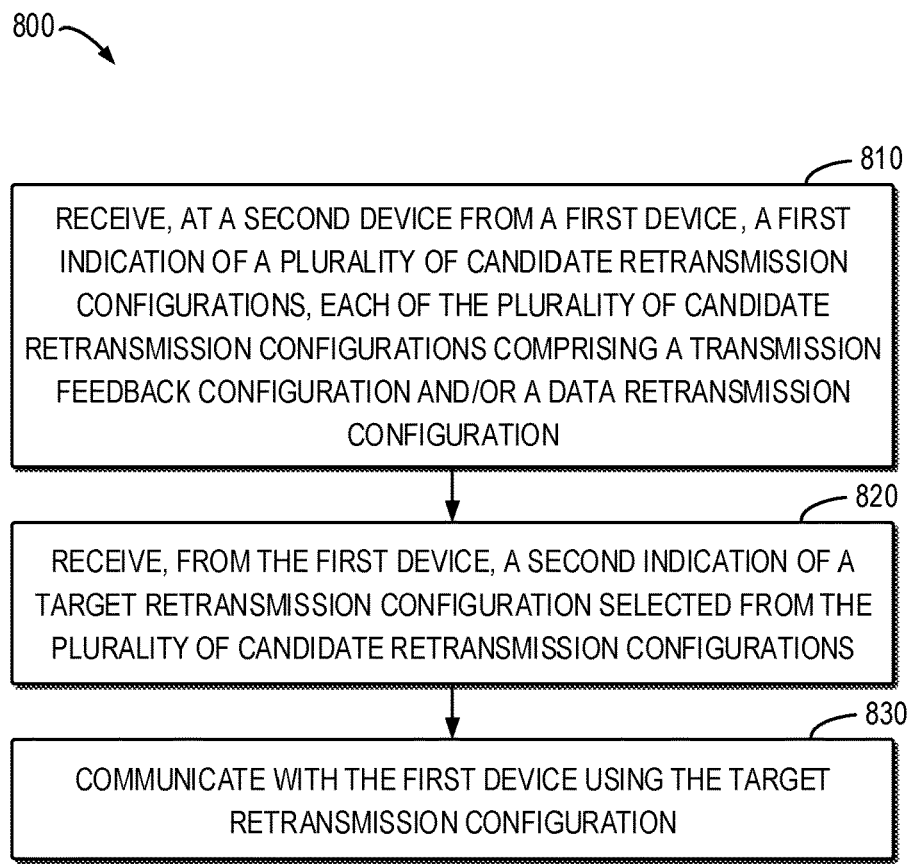
FIG. 8 illustrates a flowchart of another example method in accordance with some example embodiments of the present disclosure.

FIG. 8 illustrates a flowchart of another example method 800 in accordance with some example embodiments of the present disclosure. In some example embodiments, the method 800 can be implemented at a device in a communication network, such as the second device 120 as shown in FIG. 1. Additionally or alternatively, the method 800 can also be implemented at other devices shown in FIG. 1. In some other example embodiments, the method 800 may be implemented at devices not shown in FIG. 1.

At block 810, a second device receives, from a first device, a first indication of a plurality of candidate retransmission configurations, each of the plurality of candidate retransmission configurations comprising a transmission feedback configuration and/or a data retransmission configuration. At block 820, the second device receives, from the first device, a second indication of a target retransmission configuration selected from the plurality of candidate retransmission configurations. At block 830, the second device communicates with the first device using the target retransmission configuration.

In some example embodiments, the plurality of candidate retransmission configurations are indexed using respective indexes, and the second indication comprises an index associated with the target retransmission configuration.

In some example embodiments, the method 800 further comprises: receiving, from the first device, a plurality of retransmission parameter configurations being indexed by the indexes of the plurality of candidate retransmission configurations.

In some example embodiments, the first indication is transmitted via a RRC message, and the second indication is transmitted via a DCI.

In some example embodiments, the plurality of candidate retransmission configurations comprising at least one of the following: a feedback being enabled for a transmission, a feedback being disabled for a transmission, a data retransmission being enabled for a transmission, a data retransmission being disabled for a transmission, a feedback and a data retransmission being enabled for a transmission, a feedback being enabled and a data retransmission being disabled for a transmission, a feedback and a data retransmission being disabled for a transmission, or a blind retransmission being enabled for a transmission.

In some example embodiments, the plurality of candidate retransmission configurations comprises at least one of the following: a HARQ ACK/NACK feedback function being enabled for a HARQ process, a HARQ ACK/NACK feedback function being disabled for a HARQ process, a HARQ retransmission function being enabled for a HARQ process, a HARQ retransmission function being disabled for a HARQ process, a HARQ ACK/NACK feedback function and a HARQ retransmission function being enabled for a HARQ process, a HARQ ACK/NACK feedback function being enabled and a HARQ retransmission function being disabled for a HARQ process, a HARQ ACK/NACK feedback function and a HARQ retransmission function being disabled for a HARQ process, a HARQ ACK/NACK feedback function being enabled, a HARQ retransmission function being disabled, and a blind retransmission function being enabled for a HARQ process, or a HARQ ACK/NACK feedback function and a HARQ retransmission function being disabled, and a blind retransmission function being enabled for the HARQ process.

In some example embodiments, the method 800 further comprises receiving, from the first device, an indication of one of the following: all of HARQ processes between the first device and the second device being enabled; all of the HARQ processes being disabled; or a part of the HARQ processes being disabled and the rest of the HARQ processes being enabled.

In some example embodiments, the method 800 further comprises receiving, from the first device, an indication of at least one of the following: a service data flow to be transmitted using a HARQ process with an enabled HARQ retransmission function; a service data flow to be transmitted using a HARQ process with a disabled HARQ retransmission function; or a service data flow to be transmitted using a HARQ process with an enabled blind retransmission function.

In some example embodiments, the method 800 further comprises: in response to receiving an indication of a service data flow to be transmitted using a HARQ process with an enabled HARQ retransmission function, and in response to a determination that the second indication indicates a HARQ process with a disabled HARQ retransmission function, enabling the disabled HARQ retransmission function of the HARQ process; transmitting the service data flow using the HARQ process; and transmitting, to the first device, an indication that the HARQ retransmission function of the HARQ process is enabled.

In some example embodiments, the target retransmission configuration is selected by: in accordance with a determination that the number of unsuccessfully received transmissions among a predetermined number of transmissions between the first device and the second device exceeds a threshold, selecting the candidate retransmission configuration that the feedback is enabled and the retransmission is disabled as the target retransmission configuration.

In some example embodiments, an apparatus capable of performing the method 700 (for example, the first device 110) may comprise means for performing the respective steps of the method 700. The means may be implemented in any suitable form. For example, the means may be implemented in a circuitry or software module.

In some example embodiments, the apparatus comprises means for transmitting, at a first device to a second device, a first indication of a plurality of candidate retransmission configurations, each of the plurality of candidate retransmission configurations comprising a transmission feedback configuration and/or a data retransmission configuration. The apparatus also comprises means for selecting a target retransmission configuration from the plurality of candidate retransmission configurations. The apparatus also comprises means for transmitting, to the second device, a second indication of the target retransmission configuration. The apparatus further comprises means for communicating with the second device using the target retransmission configuration.

In some example embodiments, the plurality of candidate retransmission configurations are indexed using respective indexes, and the second indication comprises an index associated with the target retransmission configuration.

In some example embodiments, the apparatus further comprises: means for transmitting, to the second device, a plurality of retransmission parameter configurations being indexed by the indexes of the plurality of candidate retransmission configurations.

In some example embodiments, the first indication is transmitted via a RRC message, and the second indication is transmitted via a DCI.

In some example embodiments, the plurality of candidate retransmission configurations comprising at least one of the following: a feedback being enabled for a transmission, a feedback being disabled for a transmission, a data retransmission being enabled for a transmission, a data retransmission being disabled for a transmission, a feedback and a data retransmission being enabled for a transmission, a feedback being enabled and a data retransmission being disabled for a transmission, a feedback and a data retransmission being disabled for a transmission, or a blind retransmission being enabled for a transmission.

In some example embodiments, the plurality of candidate retransmission configurations comprises at least one of the following: a HARQ ACK/NACK feedback function being enabled for a HARQ process, a HARQ ACK/NACK feedback function being disabled for a HARQ process, a HARQ retransmission function being enabled for a HARQ process, a HARQ retransmission function being disabled for a HARQ process, a HARQ ACK/NACK feedback function and a HARQ retransmission function being enabled for a HARQ process, a HARQ ACK/NACK feedback function being enabled and a HARQ retransmission function being disabled for a HARQ process, a HARQ ACK/NACK feedback function and a HARQ retransmission function being disabled for a HARQ process, a HARQ ACK/NACK feedback function being enabled, a HARQ retransmission function being disabled, and a blind retransmission function being enabled for a HARQ process, or a HARQ ACK/NACK feedback function and a HARQ retransmission function being disabled, and a blind retransmission function being enabled for a HARQ process.

In some example embodiments, the apparatus further comprises means for transmitting, to the second device, an indication of one of the following: all of HARQ processes between the first device and the second device being enabled; all of the HARQ processes being disabled; or a part of the HARQ processes being disabled and the rest of the HARQ processes being enabled.

In some example embodiments, the apparatus further comprises means for transmitting, to the second device, an indication of at least one of the following: a service data flow to be transmitted using a HARQ process with an enabled HARQ retransmission function, a service data flow to be transmitted using a HARQ process with a disabled HARQ retransmission function, or a service data flow to be transmitted using a HARQ process with an enabled blind retransmission function.

In some example embodiments, the means for selecting the target retransmission configuration comprises: means for, in accordance with a determination that the number of unsuccessfully received transmissions among a predetermined number of transmissions between the first device and the second device exceeds a threshold, selecting the candidate retransmission configuration that the feedback is enabled and the retransmission is disabled as the target retransmission configuration.

In some example embodiments, an apparatus capable of performing the method 800 (for example, the second device 120) may comprise means for performing the respective steps of the method 800. The means may be implemented in any suitable form. For example, the means may be implemented in a circuitry or software module.

In some example embodiments, the apparatus comprises means for receiving, at a second device from a first device, a first indication of a plurality of candidate retransmission configurations, each of the plurality of candidate retransmission configurations comprising a transmission feedback configuration and/or a data retransmission configuration. The apparatus also comprises means for receiving, from the first device, a second indication of a target retransmission configuration selected from the plurality of candidate retransmission configurations. The apparatus further comprises means for communicating with the first device using the target retransmission configuration.

In some example embodiments, the plurality of candidate retransmission configurations are indexed using respective indexes, and the second indication comprises an index associated with the target retransmission configuration.

In some example embodiments, the apparatus further comprises: means for receiving, from the first device, a plurality of retransmission parameter configurations being indexed by the indexes of the plurality of candidate retransmission configurations.

In some example embodiments, the first indication is transmitted via a RRC message, and the second indication is transmitted via a DCI.

In some example embodiments, the plurality of candidate retransmission configurations comprising at least one of the following: a feedback being enabled for a transmission, a feedback being disabled for a transmission, a data retransmission being enabled for a transmission, a data retransmission being disabled for a transmission, a feedback and a data retransmission being enabled for a transmission, a feedback being enabled and a data retransmission being disabled for a transmission, a feedback and a data retransmission being disabled for a transmission, or a blind retransmission being enabled for a transmission.

In some example embodiments, the plurality of candidate retransmission configurations comprises at least one of the following: a HARQ ACK/NACK feedback function being enabled for a HARQ process, a HARQ ACK/NACK feedback function being disabled for a HARQ process, a HARQ retransmission function being enabled for a HARQ process, a HARQ retransmission function being disabled for a HARQ process, a HARQ ACK/NACK feedback function and a HARQ retransmission function being enabled for a HARQ process, a HARQ ACK/NACK feedback function being enabled and a HARQ retransmission function being disabled for a HARQ process, a HARQ ACK/NACK feedback function and a HARQ retransmission function being disabled for a HARQ process, a HARQ ACK/NACK feedback function being enabled, a HARQ retransmission function being disabled, and a blind retransmission function being enabled for a HARQ process, or a HARQ ACK/NACK feedback function and a HARQ retransmission function being disabled, and a blind retransmission function being enabled for the HARQ process.

In some example embodiments, the apparatus further comprises means for receiving, from the first device, an indication of one of the following: all of HARQ processes between the first device and the second device being enabled; all of the HARQ processes being disabled; or a part of the HARQ processes being disabled and the rest of the HARQ processes being enabled.

In some example embodiments, the apparatus further comprises means for receiving, from the first device, an indication of at least one of the following: a service data flow to be transmitted using a HARQ process with an enabled HARQ retransmission function; a service data flow to be transmitted using a HARQ process with a disabled HARQ retransmission function; or a service data flow to be transmitted using a HARQ process with an enabled blind retransmission function.

In some example embodiments, the apparatus further comprises means for, in response to receiving an indication of a service data flow to be transmitted using a HARQ process with an enabled HARQ retransmission function, and in response to a determination that the second indication indicates a HARQ process with a disabled HARQ retransmission function, enabling the disabled HARQ retransmission function of the HARQ process; transmitting the service data flow using the HARQ process; and transmitting, to the first device, an indication that the HARQ retransmission function of the HARQ process is enabled.

In some example embodiments, the target retransmission configuration is selected by: in accordance with a determination that the number of unsuccessfully received transmissions among a predetermined number of transmissions between the first device and the second device exceeding a threshold, selecting the candidate retransmission configuration that the feedback is enabled and the retransmission is disabled as the target retransmission configuration.

Figure 9:
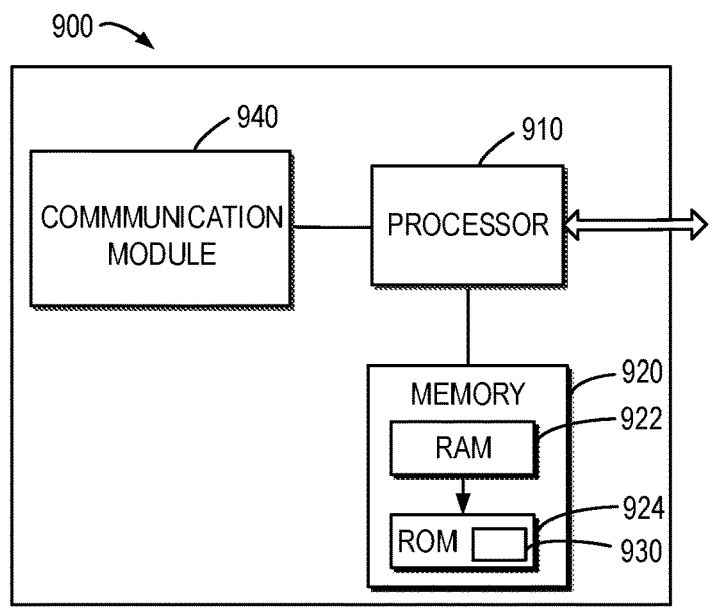
FIG. 9 illustrates a simplified block diagram of a device that is suitable for implementing example embodiments of the present disclosure.

FIG. 9 illustrates a simplified block diagram of a device 900 that is suitable for implementing example embodiments of the present disclosure. The device 900 may be provided to implement a communication device, for example, the group of devices 110 including the first device 110, the second device 120, the third device 130, and the server 140 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 may have at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The example embodiments of the present disclosure may be implemented by means of the program 930 so that the device 900 may perform any process of the disclosure as discussed with reference to FIGS. 2 to 5 and 7 to 8. The example embodiments of the present disclosure may also be implemented by hardware or by a combination of software and hardware.

Figure 10:
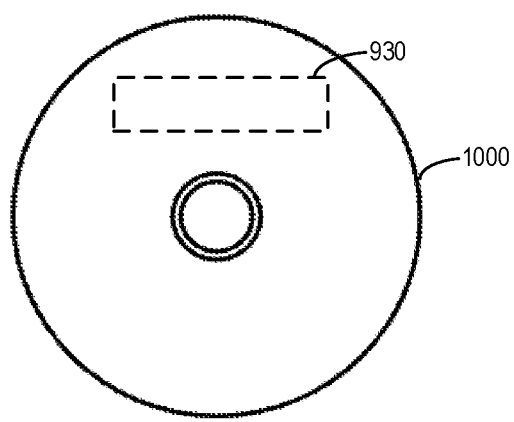
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 illustrates a block diagram of an example computer readable medium 1000 in form of CD or DVD, in accordance with some example embodiments of the present disclosure. The computer readable medium has the program 930 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700 and 800 as described above with reference to FIGS. 7 to 8. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
at least one processor; and
at least one non-transitory memory storing computer program codes;
the at least one memory and the computer program codes being configured to, with the at least one processor, cause the first device to:
transmit, to a second device, a first indication of a plurality of candidate retransmission configurations, each of the plurality of candidate retransmission configurations comprising a transmission feedback configuration and/or a data retransmission configuration;
select a target retransmission configuration from the plurality of candidate retransmission configurations;
transmit, to the second device, a second indication of the target retransmission configuration; and
communicate with the second device using the target retransmission configuration,
wherein the plurality of candidate retransmission configurations comprises:
a feedback being enabled for a transmission,
a feedback being disabled for a transmission,
a data retransmission being enabled for a transmission,
a data retransmission being disabled for a transmission,
a feedback and a data retransmission being enabled for a transmission,
a feedback being enabled and a data retransmission being disabled for a transmission,
a feedback and a data retransmission being disabled for a transmission, and
a blind retransmission being enabled for a transmission.

2. The first device of claim 1, wherein the at least one memory and the computer program codes are configured to, with the at least one processor, such that:
the plurality of candidate retransmission configurations are indexed using respective indexes, and
the second indication comprises an index associated with the target retransmission configuration.

3. The first device of claim 2, wherein the at least one memory and the computer program codes are configured to, with at least one processor, cause the first device to:
transmit, to the second device, a plurality of retransmission parameter configurations being indexed by the indexes of the plurality of candidate retransmission configurations.

4. The first device of claim 1, wherein the at least one memory and the computer program codes being configured such that:

the first indication is transmitted via a radio resource control, RRC, message, and
the second indication is transmitted via downlink control information, DCI.

5. The first device of claim 1, wherein the plurality of candidate retransmission configurations further comprises the following:
a hybrid automatic repeat request, HARQ, acknowledgement, ACK, or negative acknowledgement, NACK, feedback function being enabled for a HARQ process,
a HARQ ACK/NACK feedback function being disabled for a HARQ process,
a HARQ retransmission function being enabled for a HARQ process,
a HARQ retransmission function being disabled for a HARQ process,
a HARQ ACK/NACK feedback function and a HARQ retransmission function being enabled for a HARQ process,
a HARQ ACK/NACK feedback function being enabled and a HARQ retransmission function being disabled for a HARQ process,
a HARQ ACK/NACK feedback function and a HARQ retransmission function being disabled for a HARQ process,
a HARQ ACK/NACK feedback function being enabled, a HARQ retransmission function being disabled, and a blind retransmission function being enabled for a HARQ process, or
a HARQ ACK/NACK feedback function and a HARQ retransmission function being disabled, and the blind retransmission function being enabled for a HARQ process.

6. The first device of claim 1, wherein the at least one memory and the computer program codes are configured to, with the at least one processor, cause the first device to transmit, to the second device, an indication of the following:
all of HARQ processes between the first device and the second device being enabled.

7. The first device of claim 1, wherein the at least one memory and the computer program codes are configured to, with the at least one processor, cause the first device to transmit, to the second device, an indication of the following:
a service data flow to be transmitted using a HARQ process with an enabled HARQ retransmission function,
a service data flow to be transmitted using a HARQ process with a disabled HARQ retransmission function, and
a service data flow to be transmitted using a HARQ process with an enabled blind retransmission function.

8. The first device of claim 1, wherein the at least one memory and the computer program codes being configured to, with the at least one processor, cause the first device to select the target retransmission configuration with:
in accordance with a determination that the number of unsuccessfully received transmissions among a predetermined number of transmissions between the first device and the second device exceeds a threshold, selecting the candidate retransmission configuration that the feedback is enabled and the retransmission is disabled as the target retransmission configuration.

9. A second device, comprising:
   at least one processor; and
   at least one non-transitory memory storing computer program codes;
   the at least one memory and the computer program codes being configured to, with the at least one processor, cause the second device to:
      receive, from a first device, a first indication of a plurality of candidate retransmission configurations, each of the plurality of candidate retransmission configurations comprising a transmission feedback configuration and/or a data retransmission configuration;
      receive, from the first device, a second indication of a target retransmission configuration selected from the plurality of candidate retransmission configurations; and
      communicate with the first device using the target retransmission configuration,
      wherein the plurality of candidate retransmission configurations comprises:
      a feedback being enabled for a transmission,
      a feedback being disabled for a transmission,
      a data retransmission being enabled for a transmission,
      a data retransmission being disabled for a transmission,
      a feedback and a data retransmission being enabled for a transmission,
      a feedback being enabled and a data retransmission being disabled for a transmission,
      a feedback and a data retransmission being disabled for a transmission, and
      a blind retransmission being enabled for a transmission for a transmission.

10. The second device of claim 9, wherein the at least one memory and the computer program codes are configured to, with the at least one processor, such that:
      the plurality of candidate retransmission configurations are indexed using respective indexes, and
      the second indication comprises an index associated with the target retransmission configuration.

11. The second device of claim 10, wherein the at least one memory and the computer program codes are configured to, with the at least one processor, cause the second device to:
      receive, from the first device, a plurality of retransmission parameter configurations being indexed by the indexes of the plurality of candidate retransmission configurations.

12. The second device of claim 9, wherein the at least one memory and the computer program codes are configured to, with the at least one processor, such that:
      the first indication is transmitted via a radio resource control, RRC, message, and
      the second indication is transmitted via downlink control information, DCI.

13. The second device of claim 9, wherein the plurality of candidate retransmission configurations further comprises the following:
      a hybrid automatic repeat request, HARQ, acknowledgement, ACK, or negative acknowledgement, NACK, feedback function being enabled for a HARQ process,
      a HARQ ACK/NACK feedback function being disabled for a HARQ process,
      a HARQ retransmission function being enabled for a HARQ process,
      a HARQ retransmission function being disabled for a HARQ process,
      a HARQ ACK/NACK feedback function and a HARQ retransmission function being enabled for a HARQ process,
      a HARQ ACK/NACK feedback function being enabled and a HARQ retransmission function being disabled for a HARQ process,
      a HARQ ACK/NACK feedback function and a HARQ retransmission function being disabled for a HARQ process,
      a HARQ ACK/NACK feedback function being enabled, a HARQ retransmission function being disabled, and a blind retransmission function being enabled for a HARQ process, or
      a HARQ ACK/NACK feedback function and a HARQ retransmission function being disabled, and a blind retransmission function being enabled for a HARQ process.

14. The second device of claim 9, wherein the at least one memory and the computer program codes are configured to, with the at least one processor, cause the second device to receive, from the first device, an indication of one of the following:
      all of HARQ processes between the first device and the second device being enabled.

15. The second device of claim 9, wherein the second device is further caused to the at least one memory and the computer program codes are configured to, with the at least one processor, cause the second device to receive, from the first device, an indication of the following:
      a service data flow to be transmitted using a HARQ process with an enabled HARQ retransmission function;
      a service data flow to be transmitted using a HARQ process with a disabled HARQ retransmission function; and
      a service data flow to be transmitted using a HARQ process with an enabled blind retransmission function.

16. The second device of claim 15, wherein the second device is further caused to the at least one memory and the computer program codes are configured to, with the at least one processor, cause the second device
      in response to receiving an indication of a service data flow to be transmitted using a HARQ process with an enabled HARQ retransmission function, and in response to a determination that the second indication indicates a HARQ process with a disabled HARQ retransmission function,
      enable the disabled HARQ retransmission function of the HARQ process;
      transmit the service data flow using the HARQ process; and
      transmit, to the first device, an indication that the HARQ retransmission function of the HARQ process is enabled.

17. The second device of claim 9, wherein the at least one memory and the computer program codes are configured to, with the at least one processor, such that the target retransmission configuration is selected with:
      in accordance with a determination that the number of unsuccessfully received transmissions among a predetermined number of transmissions between the first device and the second device exceeds a threshold, selecting the candidate retransmission configuration that the feedback is enabled and the retransmission is disabled as the target retransmission configuration.

18. A method, comprising:
receiving, at a second device from a first device, a first indication of a plurality of candidate retransmission configurations, each of the plurality of candidate retransmission configurations comprising a transmission feedback configuration and/or a data retransmission configuration;
selecting a target retransmission configuration from the plurality of candidate retransmission configurations;
transmitting, to the second device, a second indication of the target retransmission configuration; and
communicating with the second device using the target retransmission configuration,
wherein the plurality of candidate retransmission configurations comprises:
a feedback being enabled for a transmission,
a feedback being disabled for a transmission,
a data retransmission being enabled for a transmission,
a data retransmission being disabled for a transmission,
a feedback and a data retransmission being enabled for a transmission,
a feedback being enabled and a data retransmission being disabled for a transmission,
a feedback and a data retransmission being disabled for a transmission, and
a blind retransmission being enabled for a transmission for a transmission.

19. A method, comprising:
receiving, at a second device from a first device, a first indication of a plurality of candidate retransmission configurations, each of the plurality of candidate retransmission configurations comprising a transmission feedback configuration and/or a data retransmission configuration;
receiving, from the first device, a second indication of a target retransmission configuration selected from the plurality of candidate retransmission configurations; and
communicating with the first device using the target retransmission configuration,
wherein the plurality of candidate retransmission configurations comprises:
a feedback being enabled for a transmission,
a feedback being disabled for a transmission,
a data retransmission being enabled for a transmission,
a data retransmission being disabled for a transmission,
a feedback and a data retransmission being enabled for a transmission,
a feedback being enabled and a data retransmission being disabled for a transmission,
a feedback and a data retransmission being disabled for a transmission, or
a blind retransmission being enabled for a transmission for a transmission.

20. A non-transitory computer readable medium comprising program instructions for causing an apparatus to perform at least the method of claim 18.

\* \* \* \* \*